US011422545B2

(12) United States Patent
Zhou et al.

(10) Patent No.: US 11,422,545 B2
(45) Date of Patent: Aug. 23, 2022

(54) GENERATING A HYBRID SENSOR TO COMPENSATE FOR INTRUSIVE SAMPLING

(71) Applicant: International Business Machines Corporation, Armonk, NY (US)

(72) Inventors: Nianjun Zhou, Chappaqua, NY (US); Dharmashankar Subramanian, White Plains, NY (US); Wesley M Gifford, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 16/895,651

(22) Filed: Jun. 8, 2020

(65) Prior Publication Data

US 2021/0382469 A1    Dec. 9, 2021

(51) Int. Cl.
*G05B 23/02* (2006.01)
*G05B 13/02* (2006.01)
*G06Q 50/04* (2012.01)

(52) U.S. Cl.
CPC ......... *G05B 23/024* (2013.01); *G05B 13/027* (2013.01); *G06Q 50/04* (2013.01)

(58) Field of Classification Search
CPC ..... G05B 23/024; G05B 13/027; G06Q 50/04
See application file for complete search history.

(56) References Cited

U.S. PATENT DOCUMENTS

| 5,386,373 A | 1/1995 | Keeler et al. |
| 5,402,333 A | 3/1995 | Cardner |
| 5,504,692 A | 4/1996 | Cardner |

(Continued)

FOREIGN PATENT DOCUMENTS

| CA | 2614173 C | 1/2007 |
| CN | 101819407 B | 9/2011 |

(Continued)

OTHER PUBLICATIONS

Khodabakhsh, A., et al., "Multivariate Sensor Data Analysis for Oil Refineries and Multi-mode Identification of System Behavior in Real-time", accepted Oct. 12, 2018, date of publication Oct. 22, 2018, date of current version Nov. 19, 2018, pp. 64389-64405, vol. 6.

(Continued)

*Primary Examiner* — Mischita L Henson
(74) *Attorney, Agent, or Firm* — Scully, Scott, Murphy & Presser, P.C.; Anthony R. Curro

(57) ABSTRACT

A hybrid sensor can be generated by training a machine learning model, such as a neural network, based on a training data set. The training data set can include a first time series of upstream sensor data having forward dependence to a target variable, a second time series of downstream sensor data having backward dependence to the target variable and a time series of measured target variable data associated with the target variable. The target variable has measuring frequency which is lower than the measuring frequencies associated with the upstream sensor data and the downstream sensor data. The hybrid sensor can estimate a value of the target variable at a given time, for example, during which no actual measured target variable value is available.

20 Claims, 14 Drawing Sheets

(56) References Cited

U.S. PATENT DOCUMENTS

| | | | |
|---|---|---|---|
| 5,570,282 A * | 10/1996 | Hansen | G05B 13/026 706/23 |
| 6,718,234 B1 | 4/2004 | Demoro et al. | |
| 7,389,186 B2 | 6/2008 | Franklin et al. | |
| 7,463,937 B2 | 12/2008 | Korchinski | |
| 8,512,550 B2 | 8/2013 | Rose et al. | |
| 9,268,326 B2 | 2/2016 | Treiber et al. | |
| 10,031,510 B2 | 7/2018 | Zhao et al. | |
| 10,235,481 B2 | 3/2019 | Trygstad | |
| 11,301,773 B2 * | 4/2022 | Lei | G06N 20/00 |
| 2016/0100135 A1 | 4/2016 | Mikula et al. | |
| 2021/0049460 A1 * | 2/2021 | Ahn | G06N 3/006 |

FOREIGN PATENT DOCUMENTS

| | | |
|---|---|---|
| CN | 102032935 B | 1/2012 |
| CN | 108776831 A | 11/2018 |
| CN | 109147878 A | 1/2019 |
| CN | 110097929 A | 8/2019 |
| WO | 2008/115655 A1 | 9/2008 |
| WO | 2018/009643 A1 | 1/2018 |

OTHER PUBLICATIONS

Allen, E.W., "Process water treatment in Canada's oil sands industry: I. Target pollutants and treatment objectives", Journal of Environmental Engineering and Science, 2008, Revision accepted Aug. 28, 2007, Published on the NRC Research Press Web site Feb. 27, 2008, pp. 123-138, vol. 7.

Penny, W.D., et al., "Forward and Backward Inference in Spatial Cognition", PLoS Computational Biology, Apr. 4, 2013, Accepted Oct. 23, 2013, Published Dec. 12, 2013, pp. 1-22, vol. 9, Issue 12.

Christ, M., et al., "tsfresh", https://tsfresh.readthedocs.io/en/latest/, Accessed on Jun. 8, 2020, 46 pages.

International Search Report dated Aug. 12, 2021 issued in PCT/CN2021/093871, 10 pages.

* cited by examiner

GENERATING A HYBRID SENSOR TO COMPENSATE FOR INTRUSIVE SAMPLING

BACKGROUND

The present application generally relates to computers and computer applications, and more particularly to generating a hybrid sensor, for example, in the process industry such as engineering, manufacturing, and/or another industry or industrial process.

In petroleum, chemical, and food process engineering and the like, the health of operation depends on the full continuous monitoring of physical variables such as pressures, temperatures, and flow rates, and chemical components and/or concentrations in the engineering process. With the deployment of sensors in the engineering process, systems implementing such process engineering can monitor such physical variables. But still, such monitoring may need to rely on intrusive manners of sampling and may involve time delays until the results of the sensor data are known. For example, monitoring of chemical analysis in the liquid flow of an industrial process relies on an intrusive manual sampling and off-line completion in a lab. Such intrusive manual sampling and lab analysis may cause potential issues such as a reduced number of samples that can be practically sampled and a lag in knowing the current chemical components of the flows. Both of the issues result in higher chances of missing the opportunities of tuning engineering processing for high productivity.

BRIEF SUMMARY

A system and method of generating a hybrid sensor, e.g., in industrial processing, can be provided. A system, in one aspect, can include a hardware processor. A storage device can be coupled with the hardware processor. The hardware processor can be configured to receive a first time series of upstream sensor data having forward dependence to a target variable. The hardware processor can also be configured to receive a second time series of downstream sensor data having backward dependence to the target variable. The hardware processor can also be configured to receive a time series of measured target variable data associated with the target variable, the target variable having a measuring frequency which is lower than measuring frequencies associated with the upstream sensor data and the downstream sensor data. The hardware processor can also be configured to determine a first time window representing a lag of the forward dependence between the upstream sensor data and the target variable. The hardware processor can also be configured to determine a second time window representing a lag of the backward dependence between the downstream sensor data and the target variable. The hardware processor can also be configured to train a machine learning model, such as a neural network, based on a training data set including at least the first time series of upstream sensor data in the first time window, the second time series of downstream sensor data in the second time window, and the time series of measured target variable data to estimate a value of the target variable at a given time.

A system, in another aspect, can include a hardware processor. A storage device can be coupled with the hardware processor. The hardware processor can be configured to receive a first time series of upstream sensor data having forward dependence to a target variable. The hardware processor can also be configured to receive a second time series of downstream sensor data having backward dependence to the target variable. The hardware processor can also be configured to receive a time series of measured target variable data associated with the target variable, the target variable having a measuring frequency which is lower than measuring frequencies associated with the upstream sensor data and the downstream sensor data. The hardware processor can also be configured to determine a first time window representing a lag of the forward dependence between the upstream sensor data and the target variable. The hardware processor can also be configured to determine a second time window representing a lag of the backward dependence between the downstream sensor data and the target variable. The hardware processor can also be configured to train a machine learning model, such as a neural network, based on a training data set including at least the first time series of upstream sensor data in the first time window, the second time series of downstream sensor data in the second time window, and the time series of measured target variable data to estimate a value of the target variable at a given time. The hardware processor can be further configured to create a causality relationship data structure forward linking in time the first time series of the upstream sensor data with the time series of measured target variable data, backward linking in time the second time series of the downstream sensor data with the times series of measured target variable data.

A system, in yet another aspect, can include a hardware processor. A storage device can be coupled with the hardware processor. The hardware processor can be configured to receive a first time series of upstream sensor data having forward dependence to a target variable. The hardware processor can also be configured to receive a second time series of downstream sensor data having backward dependence to the target variable. The hardware processor can also be configured to receive a time series of measured target variable data associated with the target variable, the target variable having a measuring frequency which is lower than measuring frequencies associated with the upstream sensor data and the downstream sensor data. The hardware processor can also be configured to determine a first time window representing a lag of the forward dependence between the upstream sensor data and the target variable. The hardware processor can also be configured to determine a second time window representing a lag of the backward dependence between the downstream sensor data and the target variable. The hardware processor can also be configured to train a machine learning model, such as a neural network, based on a training data set including at least the first time series of upstream sensor data in the first time window, the second time series of downstream sensor data in the second time window, and the time series of measured target variable data to estimate a value of the target variable at a given time. The hardware processor can be further configured to create a causality relationship data structure forward linking in time the first time series of the upstream sensor data with the time series of measured target variable data, backward linking in time the second time series of the downstream sensor data with the times series of measured target variable data. The upstream sensor data and the downstream sensor data can be selected based on the causality relationship data structure.

A system, in still another aspect, can include a hardware processor. A storage device can be coupled with the hardware processor. The hardware processor can be configured to receive a first time series of upstream sensor data having forward dependence to a target variable. The hardware processor can also be configured to receive a second time series of downstream sensor data having backward dependence to the target variable. The hardware processor can also be configured to receive a time series of measured target variable data associated with the target variable, the target variable having a measuring frequency which is lower than measuring frequencies associated with the upstream sensor data and the downstream sensor data. The hardware processor can also be configured to determine a first time window representing a lag of the forward dependence between the upstream sensor data and the target variable. The hardware processor can also be configured to determine a second time window representing a lag of the backward dependence between the downstream sensor data and the target variable. The hardware processor can also be configured to train a machine learning model, such as a neural network, based on a training data set including at least the first time series of upstream sensor data in the first time window, the second time series of downstream sensor data in the second time window, and the time series of measured target variable data to estimate a value of the target variable at a given time. The trained neural network can estimate the value of the target variable at the given time. Based on the value of the target variable estimated for the given time, the hardware processor can further control a set point in an industrial process.

A system, in another aspect, can include a hardware processor. A storage device can be coupled with the hardware processor. The hardware processor can be configured to receive a first time series of upstream sensor data having forward dependence to a target variable. The hardware processor can also be configured to receive a second time series of downstream sensor data having backward dependence to the target variable. The hardware processor can also be configured to receive a time series of measured target variable data associated with the target variable, the target variable having a measuring frequency which is lower than measuring frequencies associated with the upstream sensor data and the downstream sensor data. The hardware processor can also be configured to determine a first time window representing a lag of the forward dependence between the upstream sensor data and the target variable. The hardware processor can also be configured to determine a second time window representing a lag of the backward dependence between the downstream sensor data and the target variable. The hardware processor can also be configured to train a machine learning model, such as a neural network, based on a training data set including at least the first time series of upstream sensor data in the first time window, the second time series of downstream sensor data in the second time window, and the time series of measured target variable data to estimate a value of the target variable at a given time. The trained machine learning model, such as a neural network, can estimate the value of the target variable at the given time. Based on the value of the target variable estimated for the given time, the hardware processor can further control a set point in an industrial process. The industrial process can include oil sand processing, and the target variable can include a property associated with tailing of oil sand processing.

A system, in another aspect, can include a hardware processor. A storage device can be coupled with the hardware processor. The hardware processor can be configured to receive a first time series of upstream sensor data having forward dependence to a target variable. The hardware processor can also be configured to receive a second time series of downstream sensor data having backward dependence to the target variable. The hardware processor can also be configured to receive a time series of measured target variable data associated with the target variable, the target variable having a measuring frequency which is lower than measuring frequencies associated with the upstream sensor data and the downstream sensor data. The hardware processor can also be configured to determine a first time window representing a lag of the forward dependence between the upstream sensor data and the target variable. The hardware processor can also be configured to determine a second time window representing a lag of the backward dependence between the downstream sensor data and the target variable. The hardware processor can also be configured to train a machine learning model, such as a neural network, based on a training data set including at least the first time series of upstream sensor data in the first time window, the second time series of downstream sensor data in the second time window, and the time series of measured target variable data to estimate a value of the target variable at a given time. The machine learning model, such as a neural network, can include an aggregation of a first neural network trained to predict the value of the target variable based on the first time series of the upstream sensor data's forward dependence, a second neural network trained to predict the value of the target variable based on the second time series of the downstream sensor data's backward dependence, and a third neural network trained to predict the value of the target variable based on the times series of measured target variable data.

A system, in another aspect, can include a hardware processor. A storage device can be coupled with the hardware processor. The hardware processor can be configured to receive a first time series of upstream sensor data having forward dependence to a target variable. The hardware processor can also be configured to receive a second time series of downstream sensor data having backward dependence to the target variable. The hardware processor can also be configured to receive a time series of measured target variable data associated with the target variable, the target variable having a measuring frequency which is lower than measuring frequencies associated with the upstream sensor data and the downstream sensor data. The hardware processor can also be configured to determine a first time window representing a lag of the forward dependence between the upstream sensor data and the target variable. The hardware processor can also be configured to determine a second time window representing a lag of the backward dependence between the downstream sensor data and the target variable. The hardware processor can also be configured to train a machine learning model, such as a neural network, based on a training data set including at least the first time series of upstream sensor data in the first time window, the second time series of downstream sensor data in the second time window, and the time series of measured target variable data to estimate a value of the target variable at a given time. The machine learning model, such as a neural network, can include an aggregation of a first neural network trained to predict the value of the target variable based on the first time series of the upstream sensor data's forward dependence, a second neural network trained to predict the value of the target variable based on the second time series of the downstream sensor data's backward dependence, and a third neural network trained to predict the value of the target variable based on the times series of measured target variable data. A measured target variable's report time can have a delay from the target variable's harvest time, and the training data set, which includes the time series of measured target variable data, can include data of the measured target variable determined at report time shifted to the measured target variable's corresponding harvest time. The machine learning model, such as a neural network, at runtime can estimate the value of the target variable at the given time without the delay.

A method of generating a hybrid sensor in industrial processing, in one aspect, can include receiving a first time series of upstream sensor data having forward dependence to a target variable. The method can also include receiving a second time series of downstream sensor data having backward dependence to the target variable. The method can also include receiving a time series of measured target variable data associated with the target variable, the target variable having a measuring frequency which is lower than measuring frequencies associated with the upstream sensor data and the downstream sensor data. The method can also include determining a first time window representing a lag of the forward dependence between the upstream sensor data and the target variable. The method can also include determining a second time window representing a lag of the backward dependence between the downstream sensor data and the target variable. The method can also include training a machine learning model, such as a neural network, based on a training data set including at least the first time series of upstream sensor data in the first time window, the second time series of downstream sensor data in the second time window, and the time series of measured target variable data to estimate a value of the target variable at a given time.

In another aspect, a method of generating a hybrid sensor in industrial processing can include receiving a first time series of upstream sensor data having forward dependence to a target variable. The method can also include receiving a second time series of downstream sensor data having backward dependence to the target variable. The method can also include receiving a time series of measured target variable data associated with the target variable, the target variable having a measuring frequency which is lower than measuring frequencies associated with the upstream sensor data and the downstream sensor data. The method can also include determining a first time window representing a lag of the forward dependence between the upstream sensor data and the target variable. The method can also include determining a second time window representing a lag of the backward dependence between the downstream sensor data and the target variable. The method can also include training a machine learning model, such as a neural network, based on a training data set including at least the first time series of upstream sensor data in the first time window, the second time series of downstream sensor data in the second time window, and the time series of measured target variable data to estimate a value of the target variable at a given time. The method can further include creating a causality relationship data structure forward linking in time the first time series of the upstream sensor data with the time series of measured target variable data and backward linking in time the second time series of the downstream sensor data with the times series of measured target variable data.

In yet another aspect, a method of generating a hybrid sensor in industrial processing can include receiving a first time series of upstream sensor data having forward dependence to a target variable. The method can also include receiving a second time series of downstream sensor data having backward dependence to the target variable. The method can also include receiving a time series of measured target variable data associated with the target variable, the target variable having a measuring frequency which is lower than measuring frequencies associated with the upstream sensor data and the downstream sensor data. The method can also include determining a first time window representing a lag of the forward dependence between the upstream sensor data and the target variable. The method can also include determining a second time window representing a lag of the backward dependence between the downstream sensor data and the target variable. The method can also include training a machine learning model, such as a neural network, based on a training data set including at least the first time series of upstream sensor data in the first time window, the second time series of downstream sensor data in the second time window, and the time series of measured target variable data to estimate a value of the target variable at a given time. The method can further include creating a causality relationship data structure forward linking in time the first time series of the upstream sensor data with the time series of measured target variable data and backward linking in time the second time series of the downstream sensor data with the times series of measured target variable data. The upstream sensor data and the downstream sensor data can be selected based on the causality relationship data structure.

In another aspect, a method of generating a hybrid sensor in industrial processing can include receiving a first time series of upstream sensor data having forward dependence to a target variable. The method can also include receiving a second time series of downstream sensor data having backward dependence to the target variable. The method can also include receiving a time series of measured target variable data associated with the target variable, the target variable having a measuring frequency which is lower than measuring frequencies associated with the upstream sensor data and the downstream sensor data. The method can also include determining a first time window representing a lag of the forward dependence between the upstream sensor data and the target variable. The method can also include determining a second time window representing a lag of the backward dependence between the downstream sensor data and the target variable. The method can also include training a machine learning model, such as a neural network, based on a training data set including at least the first time series of upstream sensor data in the first time window, the second time series of downstream sensor data in the second time window, and the time series of measured target variable data to estimate a value of the target variable at a given time. The trained machine learning model, such as a neural network, can estimate the value of the target variable at the given time. Based on the value of the target variable estimated for the given time, the hardware processor can further control a set point in an industrial process.

In another aspect, a method of generating a hybrid sensor in industrial processing can include receiving a first time series of upstream sensor data having forward dependence to a target variable. The method can also include receiving a second time series of downstream sensor data having backward dependence to the target variable. The method can also include receiving a time series of measured target variable data associated with the target variable, the target variable having a measuring frequency which is lower than measuring frequencies associated with the upstream sensor data and the downstream sensor data. The method can also include determining a first time window representing a lag of the forward dependence between the upstream sensor data and the target variable. The method can also include determining a second time window representing a lag of the backward dependence between the downstream sensor data and the target variable. The method can also include training a machine learning model, such as a neural network, based on a training data set including at least the first time series of upstream sensor data in the first time window, the second time series of downstream sensor data in the second time window, and the time series of measured target variable data to estimate a value of the target variable at a given time. The trained machine learning model, such as a neural network, can estimate the value of the target variable at the given time. Based on the value of the target variable estimated for the given time, the hardware processor can further control a set point in an industrial process. The industrial process can include oil sand processing, and the target variable includes a property associated with tailing.

In another aspect, a method of generating a hybrid sensor in industrial processing can include receiving a first time series of upstream sensor data having forward dependence to a target variable. The method can also include receiving a second time series of downstream sensor data having backward dependence to the target variable. The method can also include receiving a time series of measured target variable data associated with the target variable, the target variable having a measuring frequency which is lower than measuring frequencies associated with the upstream sensor data and the downstream sensor data. The method can also include determining a first time window representing a lag of the forward dependence between the upstream sensor data and the target variable. The method can also include determining a second time window representing a lag of the backward dependence between the downstream sensor data and the target variable. The method can also include training a machine learning model, such as a neural network, based on a training data set including at least the first time series of upstream sensor data in the first time window, the second time series of downstream sensor data in the second time window, and the time series of measured target variable data to estimate a value of the target variable at a given time. The machine learning model, such as a neural network, can include an aggregation of a first neural network trained to predict the value of the target variable based on the first time series of the upstream sensor data's forward dependence, a second neural network trained to predict the value of the target variable based on the second time series of the downstream sensor data's backward dependence, and a third neural network trained to predict the value of the target variable based on the times series of measured target variable data.

In one or more aspects of the system and/or method disclosed herein, the first time series of upstream sensor data can be a one-dimensional or multi-dimensional time series data. In one or more aspects of the system and/or method disclosed herein, the second time series of downstream sensor data can be a one-dimensional or multi-dimensional time series data. In one or more aspects of the system and/or method disclosed herein, the machine learning model can be a neural network or neural network model.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
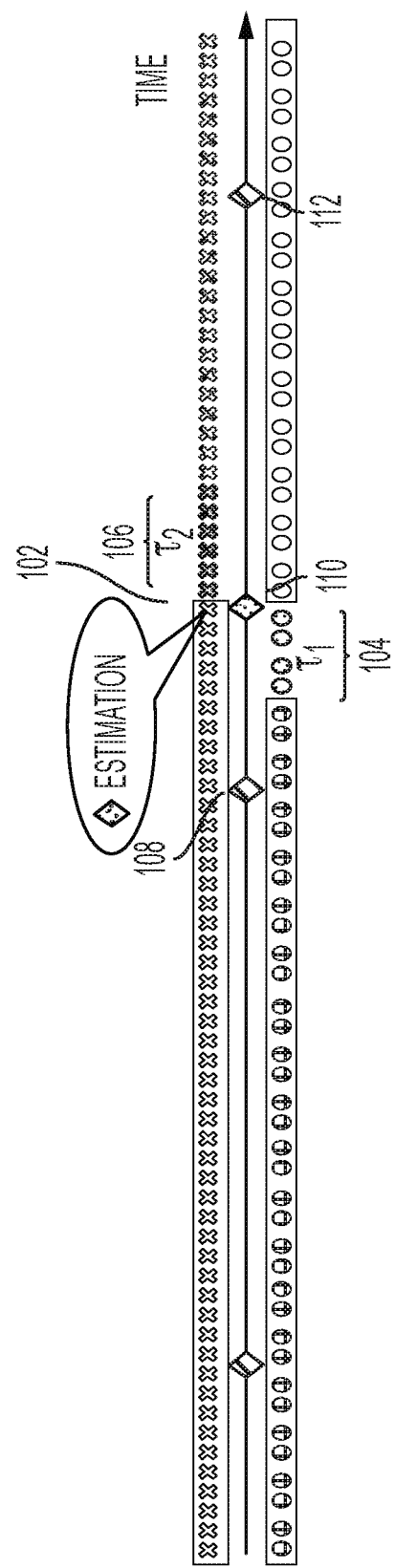
FIG. 1 is a diagram illustrating a timing diagram and different sets of measurements the system in an embodiment can operate on in implementing a hybrid sensor.

In an aspect, a system, apparatus, and method are disclosed, which can generate a hybrid sensor. For example, the system, apparatus, and method can generate a hybrid sensor to compensate for expensive, intrusive sampling using correlated high frequency sampling from non-intrusive sensors in an industrial process such as manufacturing, engineering, chemical, and other industrial processes. In an aspect, the hybrid sensor in an embodiment can provide technical improvements to existing one or more sensor devices or manual sampling, which cannot be used to measure data at a relatively high frequency, for example, at the desired rate for obtaining sensor data.

A system that can generate a hybrid sensor, for example, can include computer-implemented components, for instance, implemented and/or run on one or more processors or hardware processors, or coupled with one or more hardware processors. A method of generating a hybrid sensor can be executed and/or run on such one or more processors or hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

With the deployment of sensors in an engineering process or another industrial process, a system in an embodiment may continuously monitor the physical variables with sensory equipment, for example, in high frequency, non-intrusive, in-line sampling at intervals, e.g., with fixed intervals. In another aspect, the system may receive or obtain continuously monitored physical variables.

In an embodiment, the system can generate a hybrid sensor, which can estimate a target quantity in unmeasured space that falls in between any two consecutive target variable measurements, which are considered distant, for example, separated by a relatively long intervening duration. In an embodiment, the system may create a causality diagram or data structure to derive a hybrid sensor that fuses signals from multiple sources in a way that exploits the causality diagram or data structure. The hybrid sensor can be implemented for various processing and manufacturing industries, for example, where compositions, purity, or any quality-related quantity or variable is the target variable in question. The system may derive a timely and accurate prediction of the quantity, which for example, has been previously unavailable at the desired frequency. The hybrid sensor can provide finer resolution and earlier availability of target quantity, allowing for better proactive actions and/or decisions. For example, based on a predicted unobserved target quantity, the system can automatically or autonomously control one or more set points, for example, automatically or autonomously change one or more set points in an industrial process.

FIG. 1 is a diagram illustrating a timing diagram and different sets of measurements the system in an embodiment can operate on in implementing a hybrid sensor. The system, in an embodiment, may operate with different types or sets of measurements. Measurements provide variables or quantities, for example, such as temperature, pressure, amount of components, and/or others. A set of upstream measurements can be measured by one or more sensors at a relatively high frequency that is in-line sensing, e.g., every 5 minutes, or another time interval, which can be a fixed interval. For example, one or more sensors measure upstream data in real-time or near real-time. A time series of the upstream measurements are shown as a series of ovals in FIG. 1. There can be multiple different sets of downstream measurements. A set of downstream measurements can be measured by one or more sensors at a relatively high frequency that is also in-line sensing, e.g., every 5 minutes or another time interval, which can be a fixed interval. For example, one or more sensors measure downstream data in real-time or near real-time. A time series of the downstream measurements are shown as a series of 'x's in FIG. 1. A target measurement for a corresponding target variable or quantity, which can be measured by one or more sensors or determined based on analysis, is available only at a slower or lower frequency (e.g., every 12 hours) than the set of upstream measurements and the set of downstream measurements. A time series of a target measurement taken over time is shown as a series of diamonds in FIG. 1.

In an embodiment, a causality diagram driven model-based hybrid sensor can infer an unobserved target variable 110 at any time "t" 102, where the system operates on evidence (measured sensor data) from three sources: upstream finely measured covariates 104, e.g., representing sensor measurements from a window of time before time "t" 102 (e.g., from the immediate left side time interval before time "t" 102), downstream finely-measured covariates 106, e.g., representing sensor measurements from a window of time after time "t" 102 (e.g., from the immediate right side time interval after time "t" 102), and the most recent available measurement for the target variable 108. Upstream measurements measure upstream material or condition, e.g., raw materials that are input to the industrial process; downstream measurements measure downstream material or condition, e.g., by-products, intermediate products, produced, and/or operating conditions resulting during the process. In an embodiment, the causality diagram driven model-based hybrid sensor can be implemented as neural network architecture, in which a neural network is trained or run to predict an unobserved target variable 110, for example, between two observed target variables 108, 112.

Briefly, an artificial neural network (ANN) or neural network (NN) is a machine learning model, which can be trained to predict or classify input data. An artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data.

For instance, an industrial process may include one or more sensors which measure corresponding one or more variables or quantities, which are set or input. An example of an industrial process can be an oil sands process which can include bitumen extraction from oil sands deposit which can result in diluted bitumen, bitumen upgrading, which can result in synthetic crude oil, and crude oil refining which can produce end products such as gasoline, diesel, lubricants, and asphalt. During such industrial processing, measurements or samplings are made to monitor the process, and the quality of the intermediate and/or end products produced. Obtaining some of those measurements, however, can be intrusive, and may not be available at the desired frequency. In another aspect, samples that need lab processing can contribute to delays in obtaining measurement, for example, depending on the speed of lab processing. The hybrid sensor in an embodiment can measure or predict such unobserved measurements, for example, near real-time, and can allow for quicker response to correcting a possible problem detected in the process and/or improving the quality of the intermediate and/or end products that result during the process.

Figure 2:
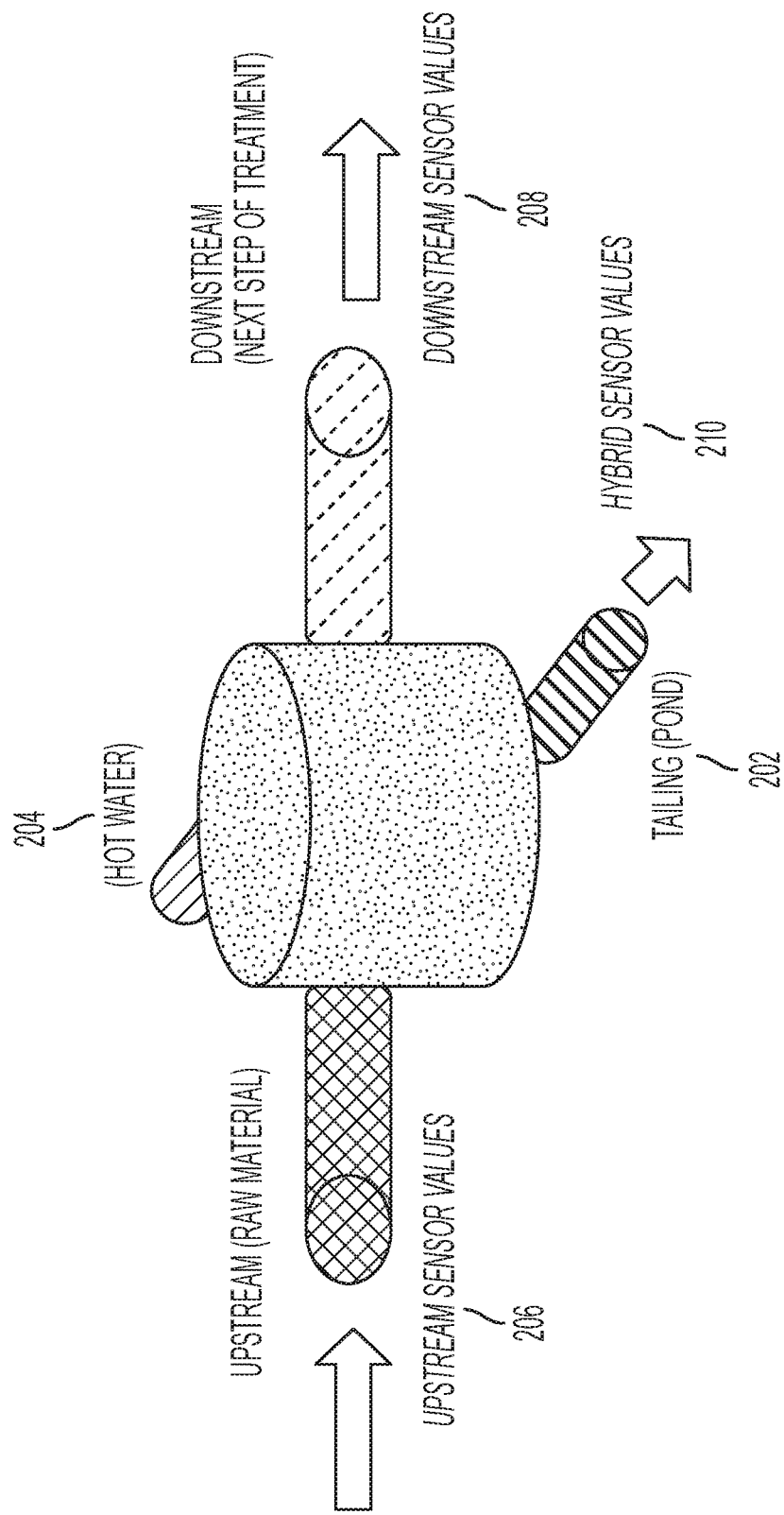
FIG. 2 is a diagram illustrating tailing sampling for the oil sands industry as an example industrial process in one embodiment.

FIG. 2 is a diagram illustrating tailing sampling for the oil sands industry as an example industrial process in one embodiment. Tailing sampling analysis can be taken twice a day. Tailings are a mixture of water, sand, clay, and residual bitumen, and are the by-product of the hot water treatment process 204 used to separate the bitumen from the sand and the clay. Tailings are stored in a large engineered dam and dyke systems called tailing ponds 202. Tailing ponds 202 are settling basins that enable processed water to be separated and continuously recycled. Water is continuously recycled from the tailings ponds back into the extraction process, reducing the use of freshwater from a river and other sources. Oil sands producers recycle 78-86% of the water used. Tailings can have an environment and also product outcome impacts. Tailings composition is correlated with high sampling-frequency, (in-line) non-intrusive sensors (e.g., measured every 5 minutes) 206 corresponding to variables that are upstream, such as raw material and downstream measurements or sensor values 208 corresponding to down-stream material resulting from hot water treatments (post-primary treatment). A hybrid sensor in an embodiment can measure tailings, for example, between the observed samplings (e.g., between sample analysis), and can provide a continuous measurement of the tailings 210.

Figure 3:
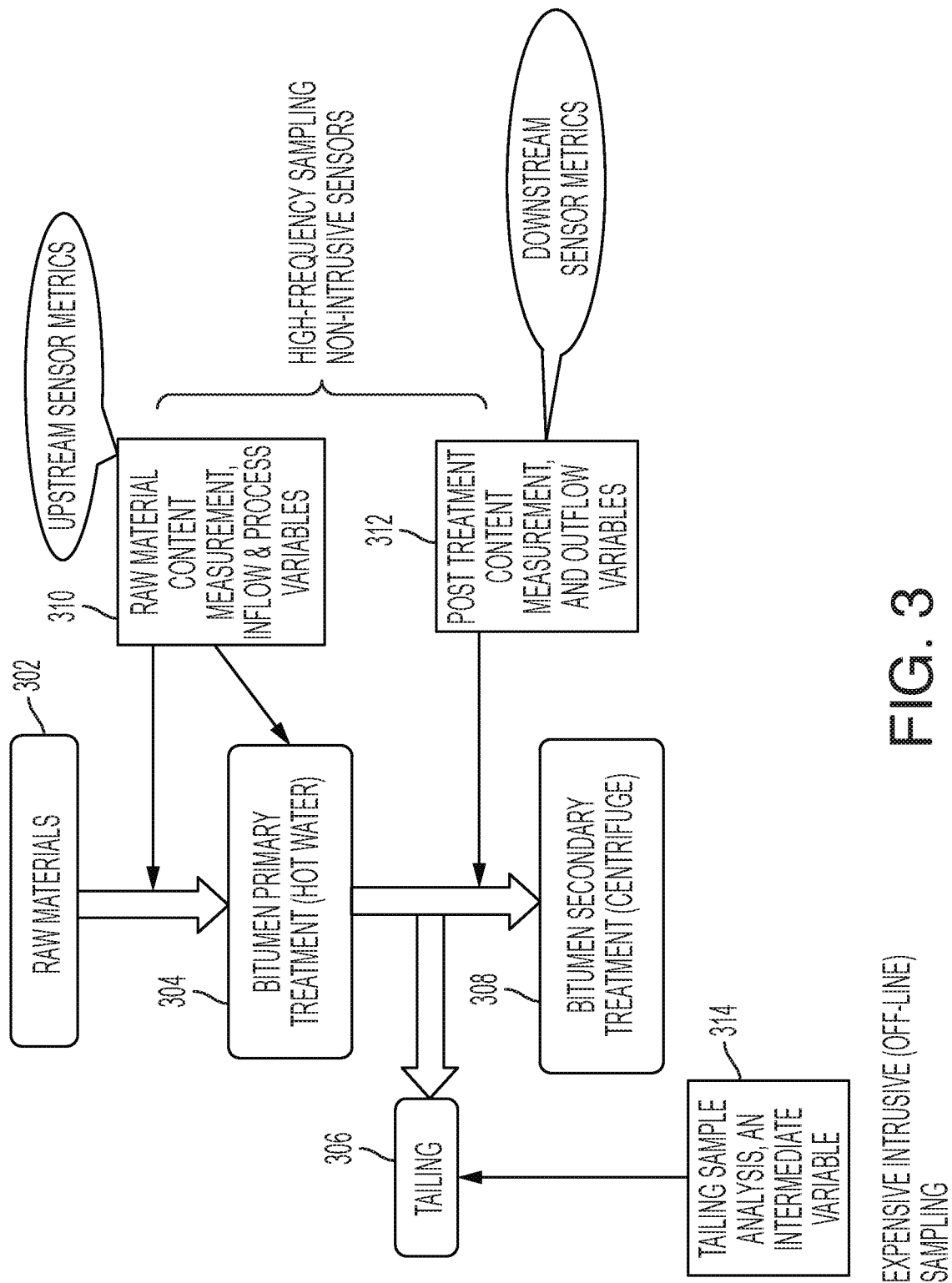
FIG. 3 is a diagram showing correlated metrics in sand oil tailing example in an embodiment.

FIG. 3 is a diagram showing correlated metrics in sand oil tailing example in an embodiment. Raw materials 302 are treated with hot water in bitumen primary treatment process 304. Various sensors measure upstream sensor data or metrics such as raw material content measurement, and inflow and process variables 310. The hot water treatment process produces tailings (by-products) 306. The rest of the bitumen mixture (other than tailings) is processed with bitumen secondary treatment, e.g., centrifuged 308. Post hot water treatment 304, various sensors also measure downstream sensor data or metrics such as post-treatment content measurement, and outflow variables 312. In this example, a target variable 314 can be a measurement associated with a tailing sample, e.g., the content of a tailing sample produced as a by-product (or intermediate variable) of the hot treatment process. Such a measurement usually is taken at a lower frequency than the upstream sensor metrics 310 and downstream sensor metrics 312 and can incur expensive intrusive sampling, for example, off-line, for example, a lab analysis. Both upstream sensor metrics 310 and downstream sensor metrics 312 are high-frequency sampling non-intrusive sensor metrics, for example, sampled at a higher frequency than the target variable sampling.

Figure 4:
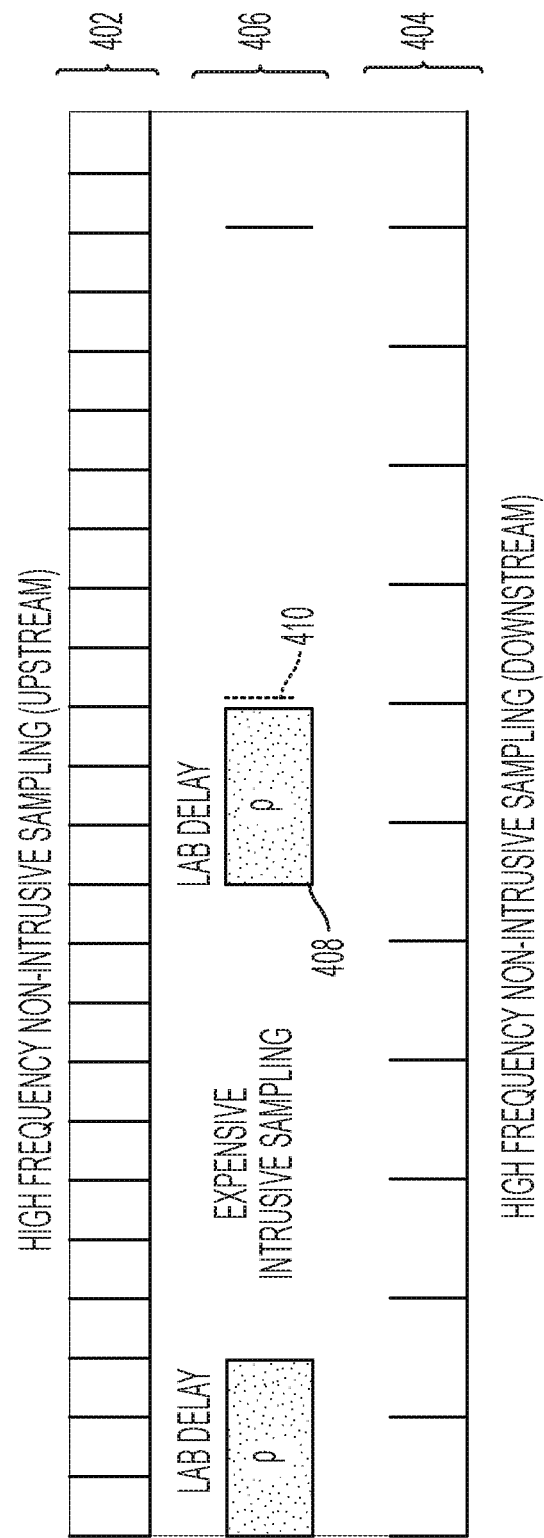
FIG. 4 shows another diagram illustrating different frequencies at which different sets of sensor data are taken in an embodiment.

FIG. 4 shows another diagram illustrating different frequencies at which different sets of sensor data are taken in an embodiment. Upstream sensor metrics 402 can be taken at fixed intervals of time, for example, at a first frequency. Downstream sensor metrics 404 can be taken at another fixed interval of time, for example, at a second frequency. A target variable 406, whose unobserved or unmeasured value is desired to be estimated, can be a variable or quantity, which is measured at a lower frequency than the first and second frequency.

In an embodiment, the system and/or method combine the real monitored less frequency values with the estimated higher frequency values to generate a hybrid sensor. The hybrid sensor allows for inferring and storing the values for variables that have intrusive, low-frequency measurements; otherwise, at a higher rate that is comparable to the high-frequency, non-intrusive measurements big data analysis. Comparable and consistent availability of measurements at a fine frequency enables better data-driven decision-making and control of a process for optimal recovery and yield at acceptable quality. In an embodiment, the hybrid sensor can allow for detecting possible environmental violations before a potential disaster or catastrophe happens, for example, due to an accumulation effect. In another aspect, the hybrid sensor can allow for identifying any massive loss of expensive or economic raw materials earlier.

Figure 5:
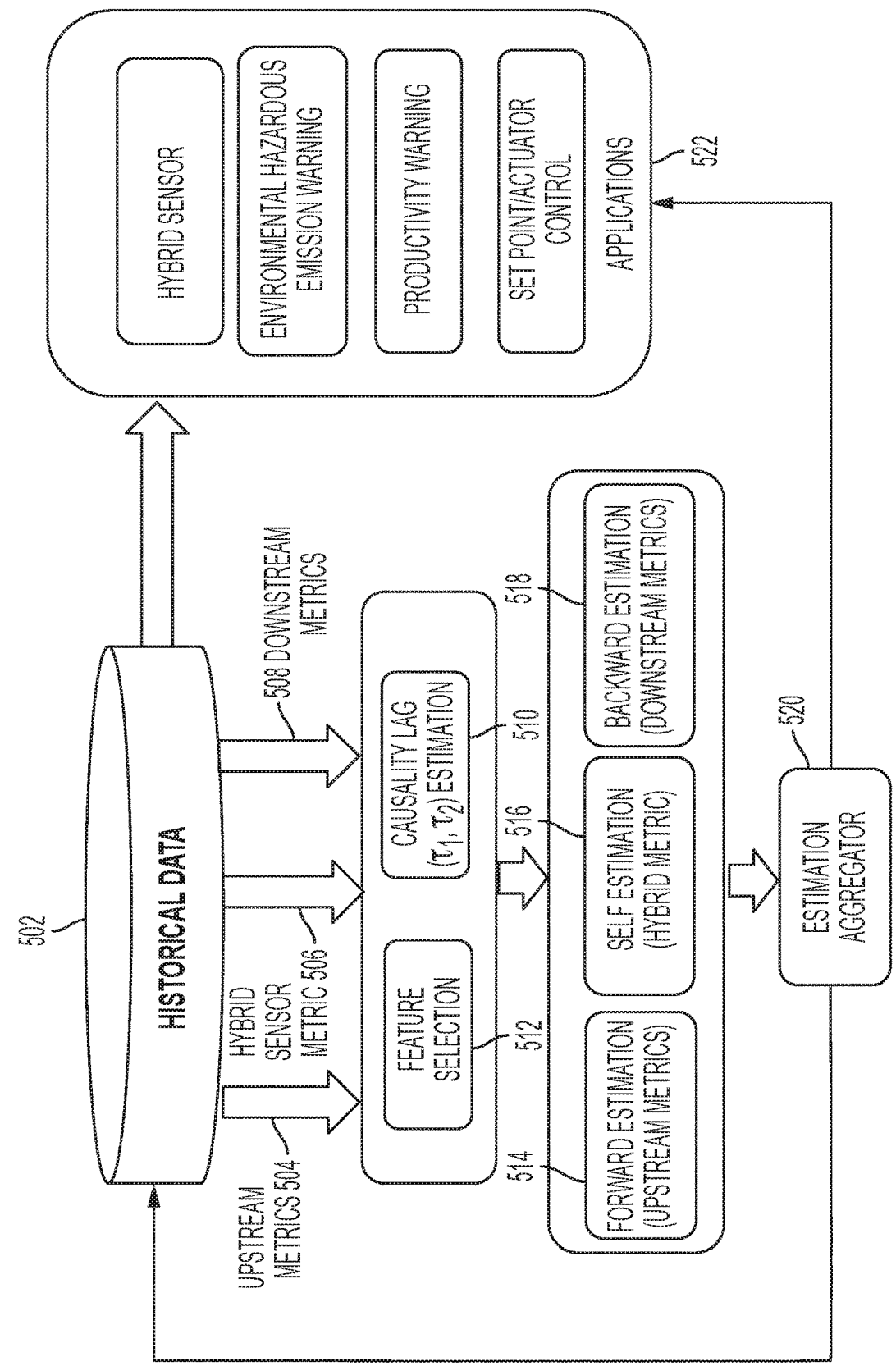
FIG. 5 is a diagram illustrating system components in an embodiment.

FIG. 5 is a diagram illustrating system components in an embodiment. The components shown include computer-implemented components, for example, one or more processors or hardware processors, as described above, executing computer processes and/or threads. The system in an embodiment can utilize a backward in time inference, using downstream (e.g., fine) measurements, forward in time inference using upstream (e.g., fine) measurements and past self (e.g., coarse) measurements in identifying one or more hidden values for the hybrid sensor. For instance, a storage device 502 can store historical data including upstream measurement (or metrics) data such as sensor measurement data, downstream measurement (or metrics) data such as sensor measurement data, and hybrid sensor data. As described above, upstream measurement data can include data associated with input material and/or conditions in a process (e.g., industry, engineering, chemical process). Downstream measurement data can include data associated with an impact on the process resulting from the processing of the input material and/or conditions. Hybrid sensor data can include data associated with a variable or attribute of the process, for which the hybrid sensor is estimating an unobserved value at a point in time, for example, in-between the time of actual measured metric. Hybrid sensor data can include historical actually measured data of the variable or attribute, and may also include previously estimated values. The upstream data and downstream data can be obtained or harvested by sensors performing high frequency sampling (e.g., higher frequency than the hybrid sensor data) in industrial processing such as physical or chemical processing in real-time. The harvested sensor results can be stored back to a repository (e.g., the storage device 502), for example, instantaneously, in real-time or near real-time.

A computer processor, for example, may receive or obtain (directly or indirectly) the upstream data 504, the downstream data 508 and the hybrid sensor data 506, for example, from a storage device 502 storing such historical database. The computer processor can also receive a time point of estimation. In an embodiment, a window of time before the time point of estimation and a window of time after the time point of estimation are determined. In subsequent processing, the upstream data measured within the window of time before the time point of estimation can be used, and the downstream data measure within the window of time after of time of estimation can be used. The window of time before the time point of estimation is also referred to as a first time window for simplicity of explanation. The window of time after the time point of estimation is also referred to as a second time window for simplicity of explanation. In an embodiment, the received data can be data within those windows of time.

At 510, the computer processor can build an internal in-memory data structure, e.g., a causality graph or causal processing graph, which represents causality or relationship between the measurements, e.g., the upstream and downstream metrics. The causality graph or causal processing graph (also referred to as a qualitative causal graph) may include specific upstream and downstream variable names and/or identities: This information can be received as an input. In an embodiment, the block shown at 510 includes a data-structure that captures this qualitative information in the form of a corresponding graph data structure which also associates the corresponding time-series data or sensor measurements for each of the variables, namely the quality-variable under question which is hard-to-sense/measure, whose value is estimated by exploiting the qualitative graph, the corresponding computational data structure with time series measurements, using an embodiment of the method disclosed herein.

In an embodiment, the computer processor may perform feature selection 512, identifies upstream sensors and downstream sensors, which have strong relationships with the target variable. Other feature selection methods can be used, which can evaluate the relationship between each input variable and the target variable using statistics and selecting those input variables that have the strongest relationships with the target variable. The selected features can include data that can be determined to be relevant to determining or estimating data of the hybrid sensor. Examples of features can include material content and operating conditions such as temperature, pressure, and other operating conditions. For example, using the example shown in FIGS. 2 and 3, features can include raw material content measurement, inflow and process variables, post-treatment content measurement, and outflow variables. Hybrid sensor data can be also selected as a feature, e.g., tailing sample data. In an embodiment, feature selection at 512 computes the parameters "tau_1" (also referred to as \tau_1), "tau_2" (also referred to as \tau_2), which are the lag and lead parameters in correspondence with the graph data structure. For instance, these parameters are computed based on the time series measurement data that is held or stored in the graph data structure.

The computer processor in an embodiment builds and uses an in-memory causal processing graph data structure (e.g., an internal computer data structure for computer processing) and identifies based on the causal processing graph data structure, upstream sensors and downstream sensors for selection.

The computer processor in an embodiment can estimate the hidden values of the hybrid sensor by forwarding inference or estimation using upstream data 514, self inference or estimation using hybrid sensor data 516 and backward inference or estimation using downstream data 518. The computer processor aggregates the estimated hidden values at 520 to the final sensor value. In an embodiment, the components shown at 514, 516, 518, and 520 can include a neural network or an aggregation of neural networks. The final value can be used, for example, for applications 522. Applications 522 can include providing a hybrid sensor, providing environmental hazardous emission warning, productivity warning, or another application. In an aspect, the hybrid sensor can be connected to a physical system and activate a controller to change one or more of input, for example, material content and/or operating condition being used in the physical system. For example, a valve or conduit that controls the amount of material content being added to the physical system can be controlled to open or close to control the amount. As another example, a setpoint setting operating conditions such as temperature, pressure, and/or another condition can be controlled. In an embodiment, the hybrid sensor value so determined can automate controlling of a physical system in real-time or near real-time, e.g., by the computer processor directly communicating with a controller of the physical system. The hybrid sensor value that is determined can also be stored in the storage device 502, for example, in real-time or near real-time. The stored hybrid sensor value can be made available for application 522.

Figure 6:
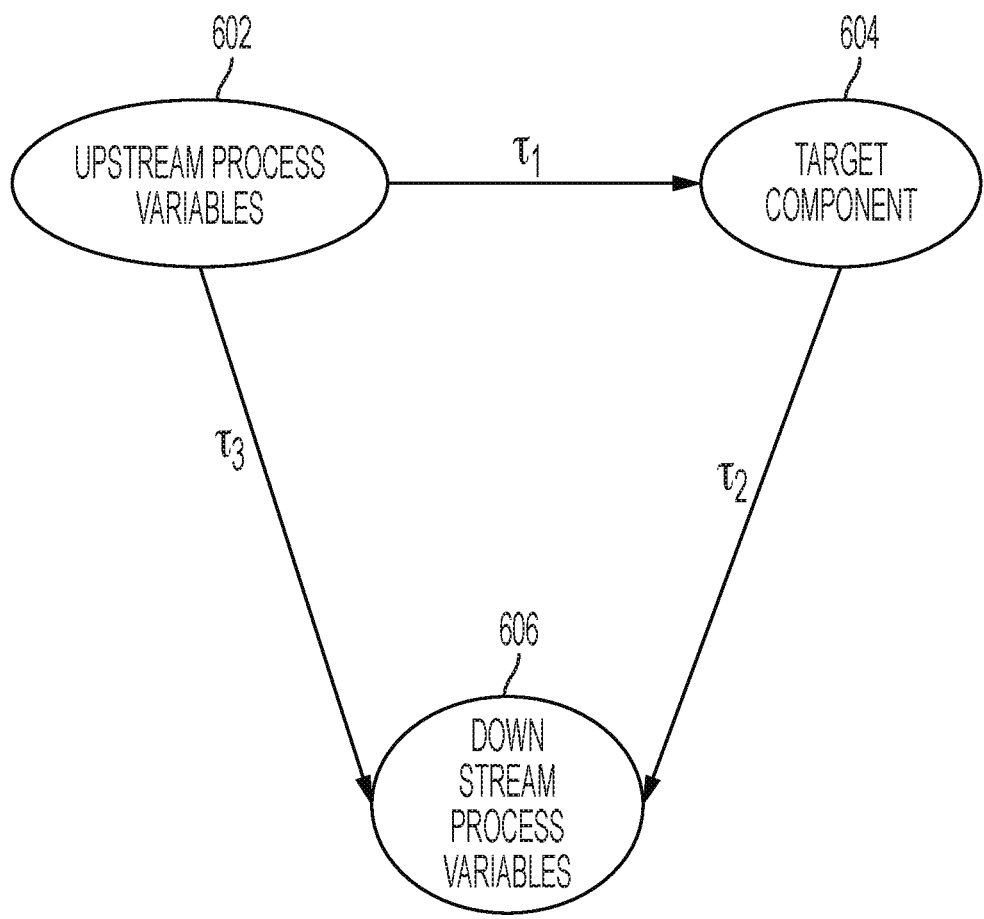
FIG. 6 shows a causal processing graph (causality graph) in an embodiment.

FIG. 6 shows a causal processing graph (causality graph) in an embodiment. Upstream process variables (upstream sensors or features) 602 having an impact on the target variable 604 are linked in the data structure. The target variable 604 is also linked to downstream process variables 606 impacted by the target component. In an embodiment upstream process variables 602 that impact the downstream process variables, 606 can be also linked.

In an embodiment, causality is effectuated from the industrial process orders such as the physical and chemical process order. Tau_1, tau_2, and tau_3, which are values greater than zero, represent the time lags for the impact. One or more of those lags can be used as the time series windows for analyses, e.g., for determining or estimating the unobserved hybrid sensor. For example, a time period from time point t−tau_1 to time point t, the time point t being the time at which the unobserved hybrid sensor is to be estimated, the impact of the upstream process variables on the target variable can be observed by the relationship between the upstream process variables on the target variable during that time period (also referred to as the first time window above).

Downstream variables 606 in a time period from the time point t to time point t+tau_2 (also referred to as a second time window above) can be observed. In an embodiment, tau_3 is greater than equal to tau_1, tau_3 is greater than equal to tau_2, and tau_3 can be equivalent to tau_1+tau_2.

Figure 7:
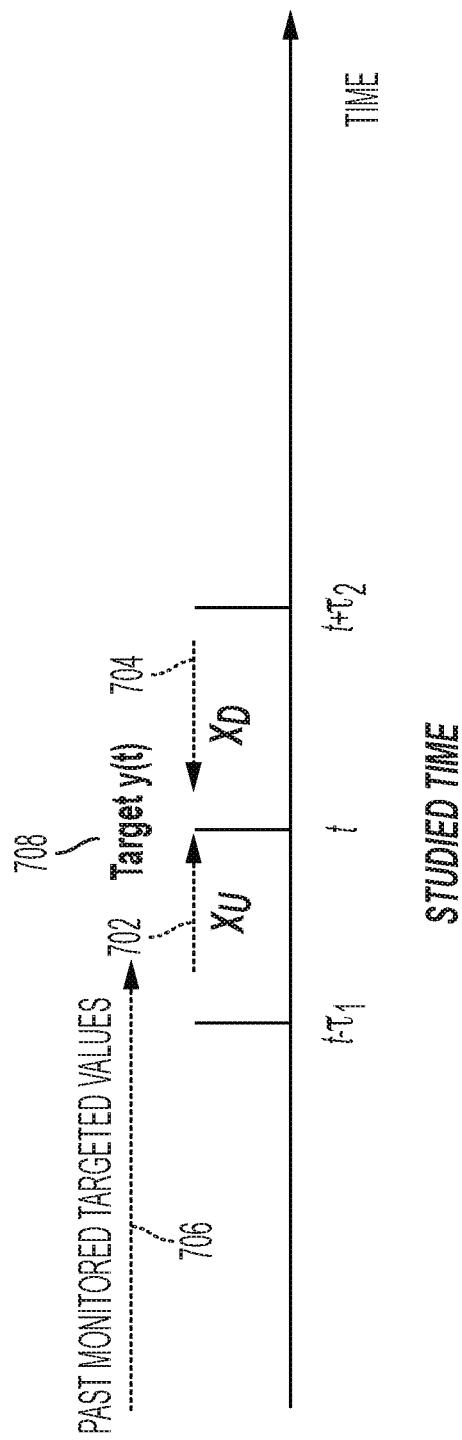
FIG. 7 is another diagram illustrating a time horizon associated with the sources of data used in estimating the target sensor value in an embodiment.

FIG. 7 is another diagram illustrating a time horizon associated with the sources of data used in estimating the target sensor value in an embodiment. The sources of data include upstream data (x_u) 702 obtained or monitored for the time period t−tau_1 to t, downstream data (x_d) 704 obtained or monitored for the time period t to t+tau_2, and past monitored target values (y(t)) 706. A target variable 708, for example, a hybrid sensor value, is estimated at time t. The system, for example, a computer processor of the system, can generate a near real-time hybrid sensor. In an aspect, the maximum of delay of the sensor value determined at time point t is tau_2. The value of tau_2 is small, for example, 2 minutes. In such an example, the intervals of time between downstream data sampling can be smaller than tau_2.

Figure 8:
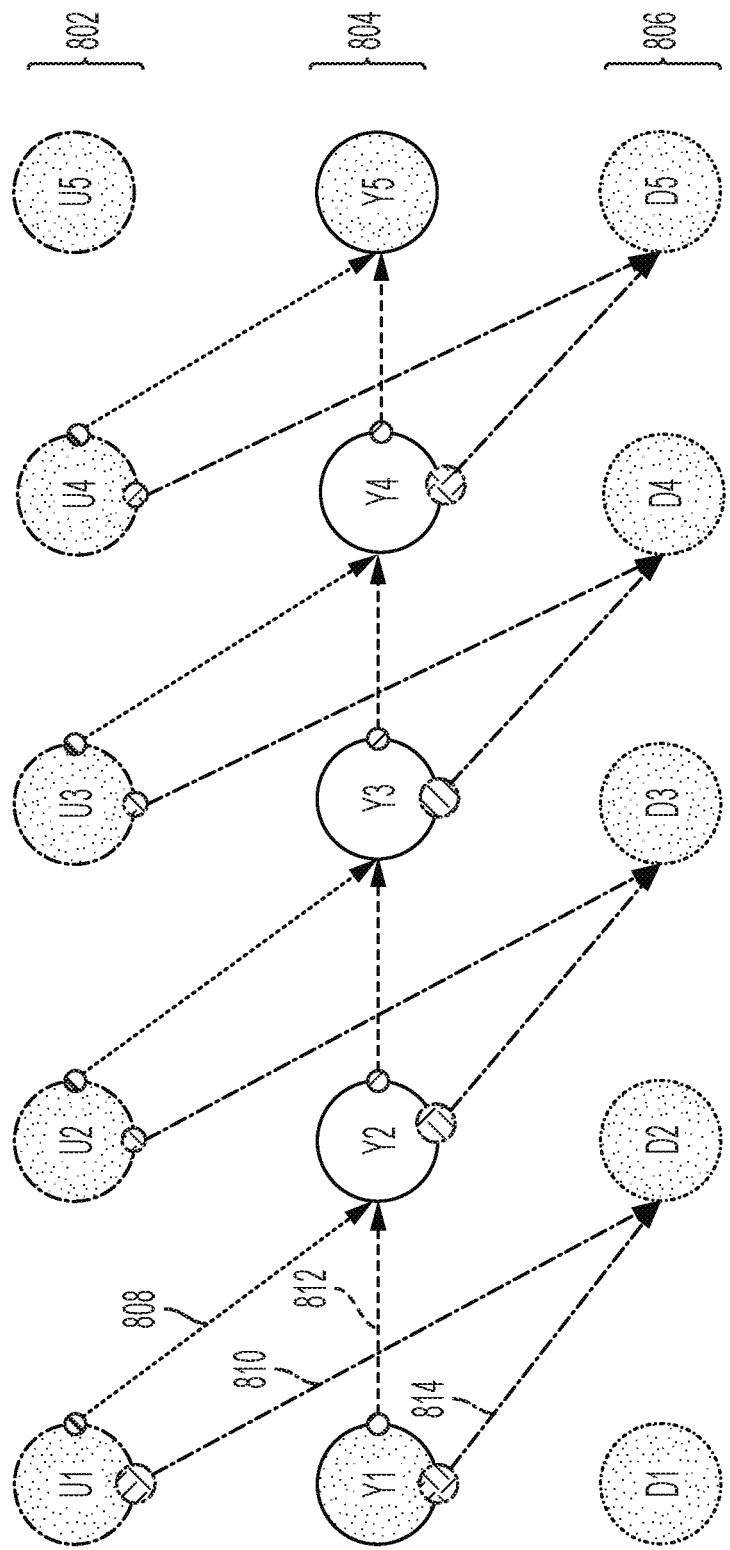
FIG. 8 is a diagram illustrating a dynamic graph for forward and backward inference relationships in an embodiment.

FIG. 8 is a diagram illustrating another dynamic graph for forward and backward inference relationships in an embodiment. A time series of upstream data 802 has forward inference relationships with a times series of target variables 804 and a time series of downstream data 806, for example, shown at 808 and 810, from a previous time step to a next time step. In a time series of target variables 804, a target variable has a relationship with a next target variable in a next time step, for example, as shown at 812. A time series of downstream data 806 has a backward inference relationship with a time series of target variables, for example, a downstream data in a next time step has a relationship with a target variable in a previous time step, for example, as shown at 814.

Figure 9:
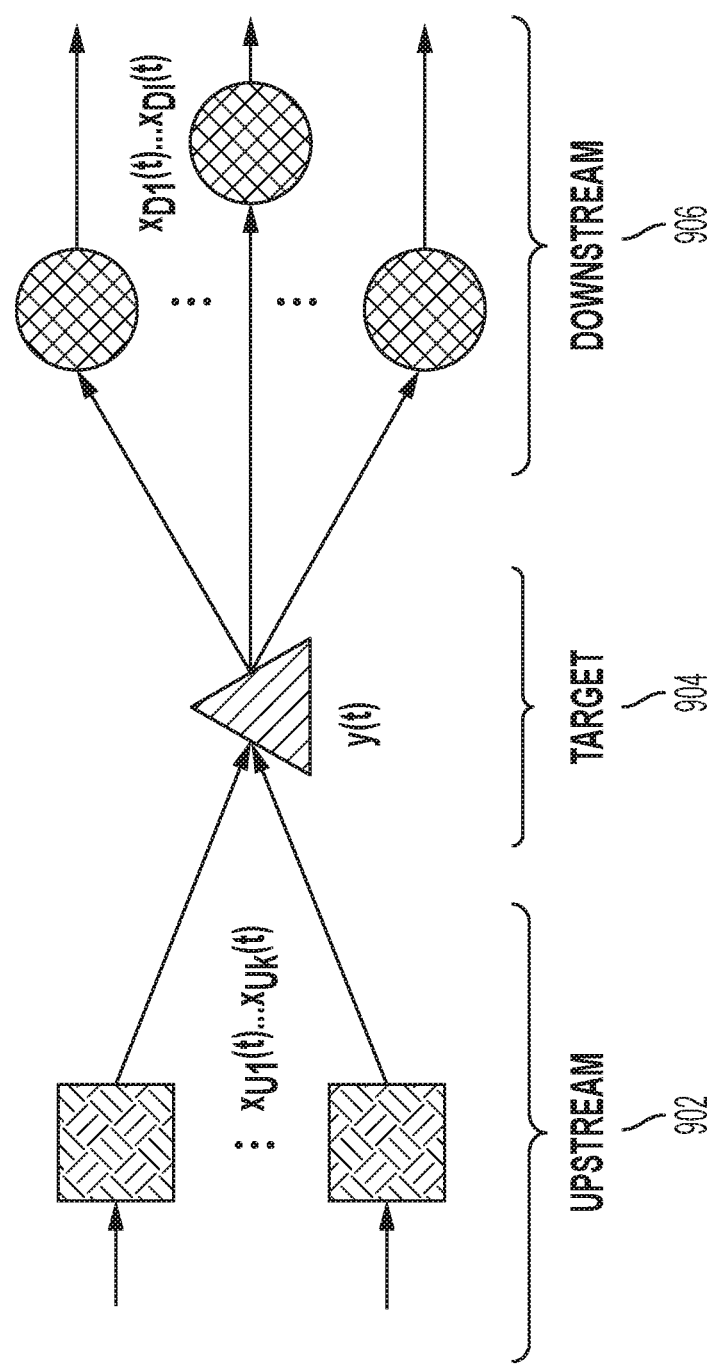
FIG. 9 is a diagram illustrating a process flow of upstream, target, and downstream variables in determining one or more hidden sensor values in an embodiment.

FIG. 9 is a diagram illustrating a process flow of upstream, target, and downstream variables in determining one or more hidden sensor values in an embodiment. The process flow uses dynamic graphs in an embodiment. Upstream variables or data or sensor data 902 include one or more upstream variables or features, e.g., U1 . . . Uk, k referring to the number of different upstream variables. While not shown, a time series of upstream variables (e.g., from t to t−tau_1) for each of the different upstream variables can be used. Target variable 904 in an embodiment is one variable, e.g., y, and whose value is being estimated at time t, y(t). Downstream variables or data or sensor data 906 can include one or more downstream variables or features, e.g., D1 . . . Dl, l (letter l) referring to the number of different downstream variables. While not shown, a time series of downstream variables (e.g., from t to t+tau_2) for each of the different upstream variables can be used.

Figure 10:
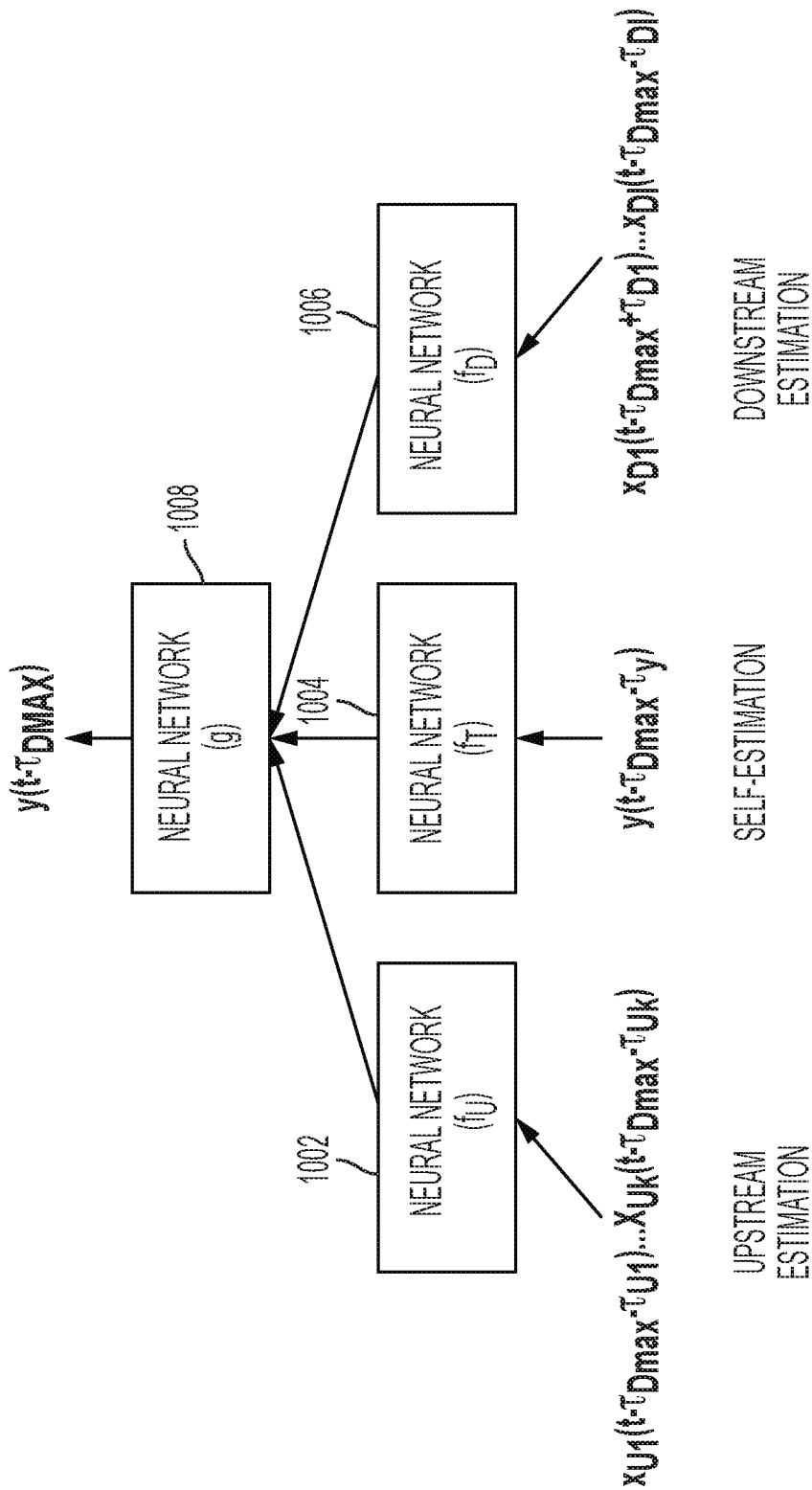
FIG. 10 is a diagram illustrating neural network architecture in an embodiment that can be trained to estimate a target variable at a given time point.

FIG. 10 is a diagram illustrating neural network architecture in an embodiment which can be trained to estimate a target variable at a given time point. For example, a trained neural network can function as a hybrid sensor.

A neural network ($f_U$) 1002 performs upstream estimation. Using ground truth values of upstream data and a target variable as impacted by the upstream data, the neural network ($f_U$) is trained to estimate a target variable given feature values of upstream data (e.g., a time series) at any given point in time. In an embodiment, the neural network 1002 computes an intermediate feature, namely the value that is output by this neural network. This intermediate feature (or value produced by this neural network) captures the separable influence on the target due to lagged values of upstream variables alone. The input into the neural network 1002 is a historical window for each upstream variable (XU1, XU2, . . . ). For each of these upstream variables, e.g. XU_1, the input into the neural network 1002 can be a window of time series data that starts from $(t-\tau_{Dmax}-\tau_{U1})$ and ends at $(t-\tau_{Dmax})$, i.e., consecutive values, over a window that starts at $(t-\tau_{Dmax}-\tau_{U1})$, and ends at $(t-\tau_{Dmax})$.

Input to the neural network can be $X_{U1}$ $(t-\tau_{Dmax}-\tau_{U1})$ . . . $X_{Uk}$ $(t-\tau_{Dmax}-\tau_{Uk})$. In an embodiment, the input into the neural network is a historical window of a pre-determined length (say W>=1) for each of the upstream variables (XU1, XU2, . . . ). For each of these upstream variables, e.g., XU_k, the input can be a window of time series data that starts from $(t-\tau_{Dmax}-\tau_{U1})$ and ends at $(t-\tau_{Dmax})$, i.e., consecutive values over a window that ends at $(t-\tau_{Dmax}-\tau_{U1})$. In an embodiment, each training point corresponds to a time-point in time where the target variable has been measured; e.g., if t* is a point in time where the target has been measured in training data, then, $(t-\tau_{Dmax}=t^*)$, and all the different windows of inputs, relative to the above training point in time, t*, can be implied by the above description. In an embodiment, this procedure chooses training points, t*, such that, the procedure also has measurements for all the downstream variables, which are measurements in time later that t*, namely, over $(\tau_{Dmax}+t^*)$. After such training, the procedure is always equipped to produce an estimate of the target variable at time $(t-\tau_{Dmax})$, if the current time is t. Output of the neural network 1002 is the estimated target variable.

Here "t" is used to denote the current time, when the system and/or method in one embodiment disclosed herein, is used in practice. Relative to real-time "t", the system may produce an estimate of the target variable at time $(t-\tau_{Dmax})$ Relative to such a time point, i.e., relative to time $(t-\tau_{Dmax})$, the system is guaranteed to have all the downstream variables at their respective "lead" times, because the most limiting such "lead" time is the downstream variable whose "lead" time is $\tau_{Dmax}$. Since the system is at real time "t", relative to time-instant that is $(t-\tau_{Dmax})$, the system has access to all the measured values of the downstream variables.

$\tau_{Dmax}$ refers to a time window of a maximum delay between the time point at which the target variable is being estimated and tau_2 (end of sampling time point for downstream data).

"Lead" relative to any time, e.g., "tau" or \tau, refers to time that is to the right (later, or in the future), relative to the time \tau.

"Lag" relative to any time, e.g., \tau, refers to time that is to the left (before, or in the past), relative to the time \tau.

\tau_{U_k}: All these are "lags", since upstream variables that are influential/causal are lagged values from the past. "U" refers to upstream. U1 to Uk refer to k different upstream data. For example, k number of upstream data can be used, each having a time series of values.

\tau_{D_k}: All these are "leads", since downstream variables that are influential/causally related are later/leading values from the relative future. "D" refers to downstream.

Here "t" is used to denote the current time, e.g., when the system and/or method disclosed herein is used in practice. Relative to real-time "t", the system can produce an estimate of the target variable at time $(t-\tau_{Dmax})$. Relative to time $(t-\tau_{Dmax})$, the system uses the lagged values of the upstream variables. For an upstream variable, U_1, that would mean, the lagged values of variable U_1, relative to the estimated time point, namely, time $(t-\tau_{Dmax})$, with a lag \tau_{U_1}: Hence the time stamp, $t-\tau_{Dmax}-\tau_{U}1$ As described above, for each of these upstream variables, e.g., XU_1, an input can be a window of time series data of consecutive measurements, that starts from $(t-\tau_{Dmax}-\tau_{U1})$ and ends at $(t-\tau_{Dmax})$, i.e., consecutive values over a window that ends at $(t-\tau_{Dmax})$.

A neural network ($f_T$) 1004 performs self-estimation. By using ground truth values of a target variable and its impact on the next target variable, the neural network ($f_T$) is trained to estimate or predict a next target variable value, given a target variable value. Input to the neural network 1004 can be $y(t-\tau_{Dmax}-\tau_{\{y\}})$. "$\tau_{\{y\}}$" represents the previous, most recent in the past, measurement time stamp for the coarsely measured target variable "y". It is also a window of consecutive past measurements of length W (>=1), that ends at time stamp \tau_{y}. When W=1, it is the indeed the most recent measurement. When W=2, it is the most recent two measurements from the past, and so on. W is a modeling parameter. W can be pre-chosen or pre-configured as a configuration parameter. Output of the neural network 1004 is the estimated target variable.

A neural network ($f_D$) 1006 performs downstream estimation. Using ground truth values of downstream data and a target variable that impacts the downstream data (backward inference), the neural network ($f_D$) 1006 can be trained to predict or estimate a target variable given future downstream data. Input to the neural network 1006 can be $x_{Dl}$ $(t-\tau_{Dmax}-\tau_{Dl})$, . . . , $x_{Dl}$ $(t-\tau_{Dmax}-\tau_{Dl})$. In $D_1$ . . . $D_l$, l (letter l) refer to the number of different downstream variables, 1 . . . l (letter l).

A neural network (g) 1008 aggregates the neural networks 1002, 1004 and 1006 to output aggregated target variable estimation. For example, neural network (g) can be trained based on ground truth values of neural networks at 1002, 1004 and 1006 and output an aggregated target value. For example, the neural network (g) 1008 can estimate $y(t-\tau_{Dmax})$.

$$y(t-\tau_{Dmax})=g(f_U(x_{U1}(t-\tau_{Dmax}-\tau_{U1}), \ldots, x_{Uk}(t-\tau_{Dmax}-\tau_{Uk}),$$

$$f_T(y(t-\tau_{Dmax}-\tau_y),$$

$$f_D(x_{Dl}(t-\tau_{Dmax}-\tau_{Dl}), \ldots x_{Dl}(t-\tau_{Dmax}-\tau_{Dl}))$$

Tau $D_{max}$=$\max_i$ tau$_{Di}$. For example, Tau $D_{max}$ is the end time point for the time series window of downstream data. The neural network (g) 1008, for example, functions as a hybrid sensor.

Here, "t" refers to the real-time, current time "t", for example, as it pertains to the system in real-time use. Relative to real-time "t", the system can produce an estimate of the target variable at time (t–tau$_{Dmax}$).

Figure 11:
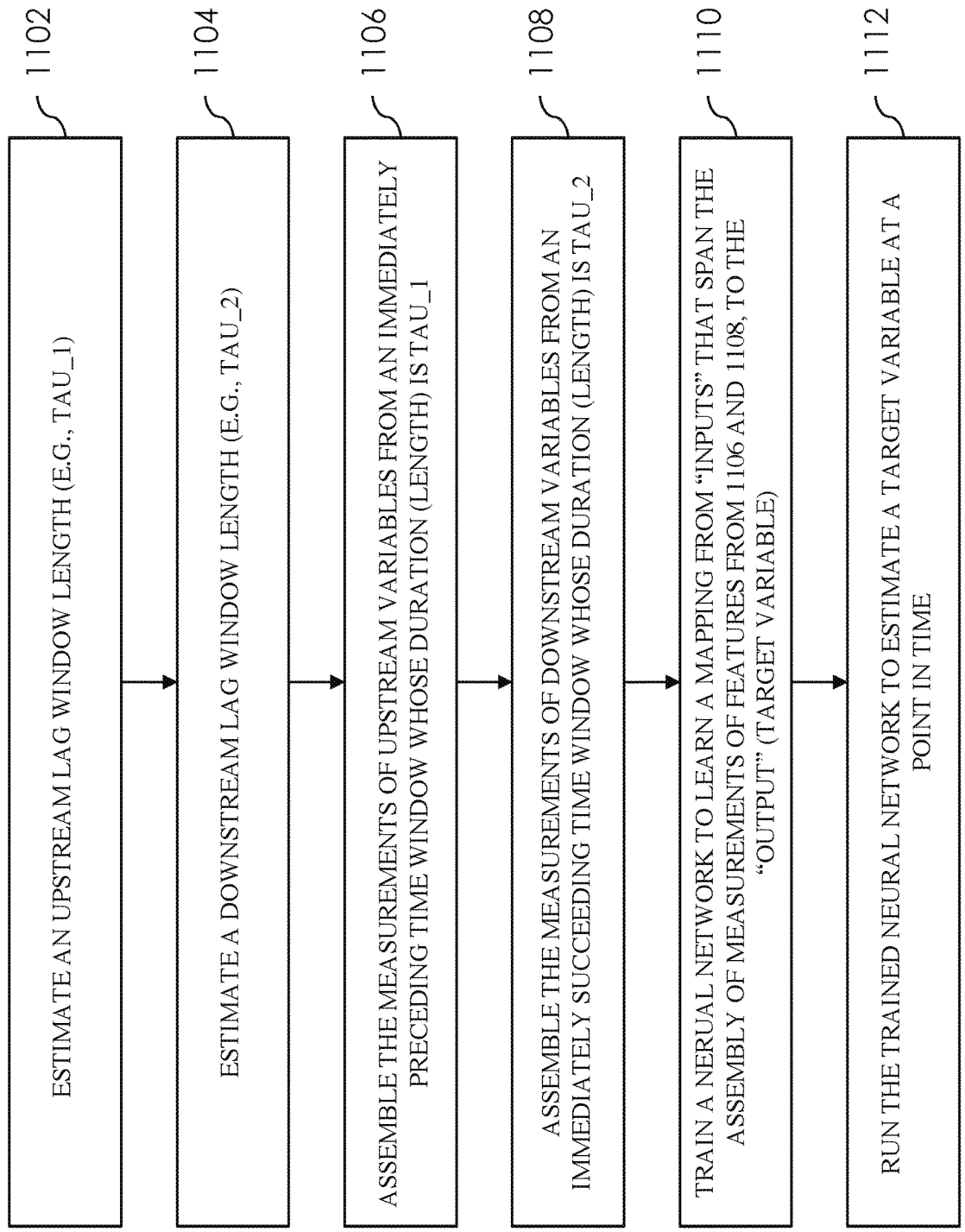
FIG. 11 is a flow diagram illustrating a method in an embodiment.

FIG. 11 is a flow diagram illustrating a method in an embodiment. A processor or a hardware processor can execute the method in an embodiment. At 1102, the method can include estimating an upstream lag window length (e.g., tau_1) that is relevant for forward dependence of a target variable measured at the target variable harvested time. In an embodiment, the lags and leads are estimated using known standard time-series statistical techniques. For instance, the cross-correlation is computed between the target and each upstream variable, for different values of lags (e.g., 1, 2, 3, 4, . . . ), and the lag that corresponds to the highest cross-correlation between the upstream variable and the target is chosen as the "lag" parameter. In yet another approach, the system may leave this "lag" parameter, as a model-hyperparameter over a range of lags, e.g., [1, 2, 3, . . . , L], and choose the optimal lag value for each upstream variable, using a validation set and hyperparameter tuning. Lag" relative to any time, e.g., \tau, refers to time that is to the left (before, or in the past), relative to the time \tau. \tau_{U_k}: All these values are "lags", since upstream variables that are influential/causal are lagged values from the past.

At 1104, the method can include estimating a downstream lag window length (e.g., tau_2) that is relevant for backward dependence of a target variable measured at the target variable harvested time. In an embodiment, the lags and leads are estimated using known standard time-series statistical techniques. For instance, the cross-correlation is computed between the target and each downstream variable, for different values of lags (e.g., 1, 2, 3, 4, . . . ), and the lead that corresponds to the highest cross-correlation between the downstream variable and the target is chosen as the "lead" parameter. In yet another approach, the system may leave this "lead" parameter, as a model-hyperparameter over a range of lags, e.g., [1, 2, 3, . . . , L], and choose the optimal lead value for each downstream variable, using a validation set and hyperparameter tuning. "Lead" relative to any time, e.g., \tau, refers to time that is to the right (later, or in the future), relative to the time \tau. \tau_{D_k}: All these values are "leads", since downstream variables that are influential/causal are later/leading values from the relative future.

At 1106, the method can include assembling the measurements of upstream variables from an immediately preceding time window (from the target variable harvested time) whose duration (length) is tau_1 from 1102. The upstream variables include finer or higher frequency measurements than the measurement frequency of a target variable, which a hybrid sensor is being generated to estimate. This time window is also referred to as a first time window. In an embodiment, various time-series feature derivations can be also performed over the first time window. Known techniques can be used to derive time-series features from a time-series window that has one or more consecutive measurements.

At 1108, the method can include assembling the measurements of downstream variables from an immediately succeeding or following time window (from the target variable harvested time) whose duration (length) is tau_2 from 1104. The downstream variables include finer or higher frequency measurements than the measurement frequency of a target variable, which a hybrid sensor is being generated to estimate. This time window is also referred to as a second time window. In an embodiment, various time-series feature derivations can be performed over the second time window. Known techniques can be used to derive time-series features from a time-series window that has one or more consecutive measurements.

At 1110, the method can include learning (training) a mapping from "inputs" that span the assembly of measurements of features from 1106 and 1108, to the "output" (target variable), which is the hybrid-sensor for the less frequently measured variable (e.g., lab-measured variable, which may have a delay), using supervision and/or ground-truth that is available in the historical data of measurements (e.g., lab-measurements). In the example case, in which there is a delay in time from harvesting and obtaining the measurement data, for example, because of a lab processing time, those "output" variables can be aligned in time against corresponding historical harvest epochs. In an embodiment, the learning includes training one or more neural networks, for example, as shown in FIG. 10.

For historical learning in this embodiment, the processing at 1106 and 1008 consider upstream and downstream windows of sizes resulting from the processing at 1102 and 1104, respectively, relative to all historical harvest epochs for which there is a corresponding target variable, for example, aligned reported lab-data for the variable of interest (e.g., the target variable, for which the hybrid sensor is being generated).

At 1112, the learned mapping or neural network at runtime can be run, for example, at any point in time (e.g., "t_any"), by constructing upstream windows and downstream windows of lengths tau_1 and tau_2, relative to time-point at (t_any–tau_2) to obtain an estimate of the hybrid sensor at time-point (t_any–tau_2). While this example shows a simple case scenario in which there is one upstream and one downstream variable, the method can operate with multiple upstream variables and/or multiple downstream variables. In an embodiment the various "lags" and "leads" can be different for each specific lagging (upstream), or leading (downstream) variable. The values used for training the neural network and inferencing by the neural network can be the same values for these "lags" and "leads" corresponding to different upstream and downstream variables respectively.

The method can provide a finer frequency of estimating of the slowly measured variable of interest (target variable). For example, at any point in continuous time, e.g., t_any, the method estimates the target variable at a previous instant in time, namely (t–tau_2).

Referring back to FIG. 4, for example, in an example scenario, in which a target variable (of interest, for which hybrid sensor is being generated) has a delay between the time of actual sampling and the time of determining the measurement value, the following terminology can apply: "Harvested time epoch" refers to time at which a sample is drawn 408 (e.g., and sent for analysis such as sent to as lab for determining the measurement value); "Reported time epoch" refers to time at which the lab report (or another analysis report) 410, after lab-related delay (or another analysis delay), is available for the corresponding harvested sample.

To create training data, which includes an input-output data, the method can align or shift the lab-reported value (or measurement value of target variable which has a delay between the harvested time epoch and reported time epoch) that arrives at "reported time", against the corresponding "harvested time". In an embodiment, the method also partitions the time horizon for the target metric (e.g., measured using intrusive sampling) based on the time from the harvested time epoch into different time periods. A training input-output data, for example, includes a time series of measured upstream data in a first window of time and a time series of measured downstream data in a second window of time (as input) and a measured target variable having harvested time after the first window of time and before the second window of time, where the first window of time, harvested time and the second window of time are consecutive in time. An aggregated neural network (e.g., shown in FIG. 10) trained based on the training data can be run to provide a hybrid sensor that can measure the target variable at a requested or given time. In an embodiment, different variables can have different rates of measurements.

For example, for a given time t, the measured value of the hybrid sensor at time t is computed based on: The measured upstream sensor values over a window of time [t−tau_1, t]; The measured downstream values over a window of time [t, t+tau_2]; The measured target variable metric (e.g., lab results for the target metric with "reported time"). The time used in training, associated with the measured target variable metric, is the aligned or shifted time shifted to corresponding harvested time (here, harvested time is less than t). In an embodiment, different variables can have different rates of measurements. Here "t" is used to denote the current time, e.g., when the system disclosed herein is used or executed in practice. Relative to real-time "t", the system can produce an estimate of the target variable at time (t−$tau_{Dmax}$) Relative to such a time point, i.e., relative to time (t−$tau_{Dmax}$), the system is guaranteed to have all the downstream variables at their respective "lead" times, because the most limiting such "lead" time would the downstream variable whose "lead" time is $tau_{Dmax}$. Since we are at real time "t", relative to time-instant that is (t−$tau_{Dmax}$), the system has access to all the measured values of the downstream variables.

In an embodiment, the method can use a causal graph to pose an estimation of a target variable (e.g., a lab-variable) in near continuous time using a bidirectional approach, e.g., using both the forward influence from the upstream variables, and the backwards influence from the downstream variables. Previously measured target variable can be also used to estimate a next target variable. The estimation can be carried out based on those three sets of measurements, for example, using a combined estimation. The estimation can be also carried out based on those three sets of measurements, for example, using a combination of individual measurements estimated for the set of measurements.

In an embodiment, the method can match a slow rate monitoring of a sensor to high rate monitoring of another sensor. For instance, the method can fill the gaps of the slow rate monitoring with values estimated using causality maps and the true values together.

In an embodiment, the method can generate a hybrid sensor to solve a problem or difficulty associated with a slow monitor rate sensor. For example, the method generates a hybrid sensor in cases where high frequency and automatic monitoring is difficult or not possible, such as in tailing monitoring, for example, creates a hybrid sensor for those less frequently monitored sensors. In an aspect, the method can find values not directly measured by the sensors, using slow-rate measurements, as well as using the causality graph.

In embodiments, a method, system and apparatus can be provided, which generate a hybrid sensor in industrial processes such as in manufacturing and chemical production processes, for target variables or metrics that involve expensive intrusive measurements with large sampling intervals (low frequency of measurement) and delays due to analysis (e.g., laboratory) work. In an embodiment, the method, for example, creates a qualitative causality diagram or data structure that shows the linking of what are upstream and downstream causal edges. The method also receives sensor data from measured variables in the industrial process at their available rate of sampling and measurement. The method also estimates a targeted variable at the same or similar high rate as the sets of upstream and downstream variables. The method can further create a hybrid sensor that uses the most recent lab measurement and the estimated value for the targeted variable. The method can, based on a result of the hybrid sensor that is generated, send an alert or signal message to the industrial process, such as but not limited to, hazardous emission alert, productivity related process warning and/or another warning. The method can also invoke or control a setpoint change in the industrial process or actuate a physical actuator to correct an error condition determined based on the hybrid sensor value.

In an embodiment, the method can create a qualitative causality diagram or data structure, for example by: determining a candidate upstream set of variables with higher rates of sampling and measurement, relative to the target variable, based on the causality relationships between those a candidate upstream set of variables and the targeted variable in the process; and determining a candidate downstream set of variables with higher rates of sampling and measurement, relative to the target variable, based on the causality relationships between those downstream set of variables and the targeted variable in the process.

In an embodiment, a combined estimation of three individual estimations can provide a higher frequency of estimation for the targeted variable. The combined estimation includes a bidirectional estimation. For example, the method uses a forward estimation to forecast the target variable using the candidate upstream set of the variables within a time window specific for this estimation. The method also uses a backward estimation to perform backwards-in-time inference of the target variable using the candidate downstream set of the metrics values within a time window specific for this estimation. The method further uses the historical values of the true measured values of the target variable. The method can create a hybrid sensor using an aggregate estimation by aggregating the above three estimates, and, e.g., can use weights and attention to each of the three estimates to determine or estimate the target variable (hybrid sensor) value at a given time.

In an embodiment, the forward and backward estimation can be done using physical or chemical principles to develop an empirical estimation model and/or using a deep learning model based on data science approaches.

In an embodiment, the time windows can be created for the forward and backward estimation by using the physical residence time and physical processing time to calculate the time windows and lags of the causality relationships between multiple variables, and/or using the time series correlation to analyze the time windows using a data-driven approach.

Figure 12:
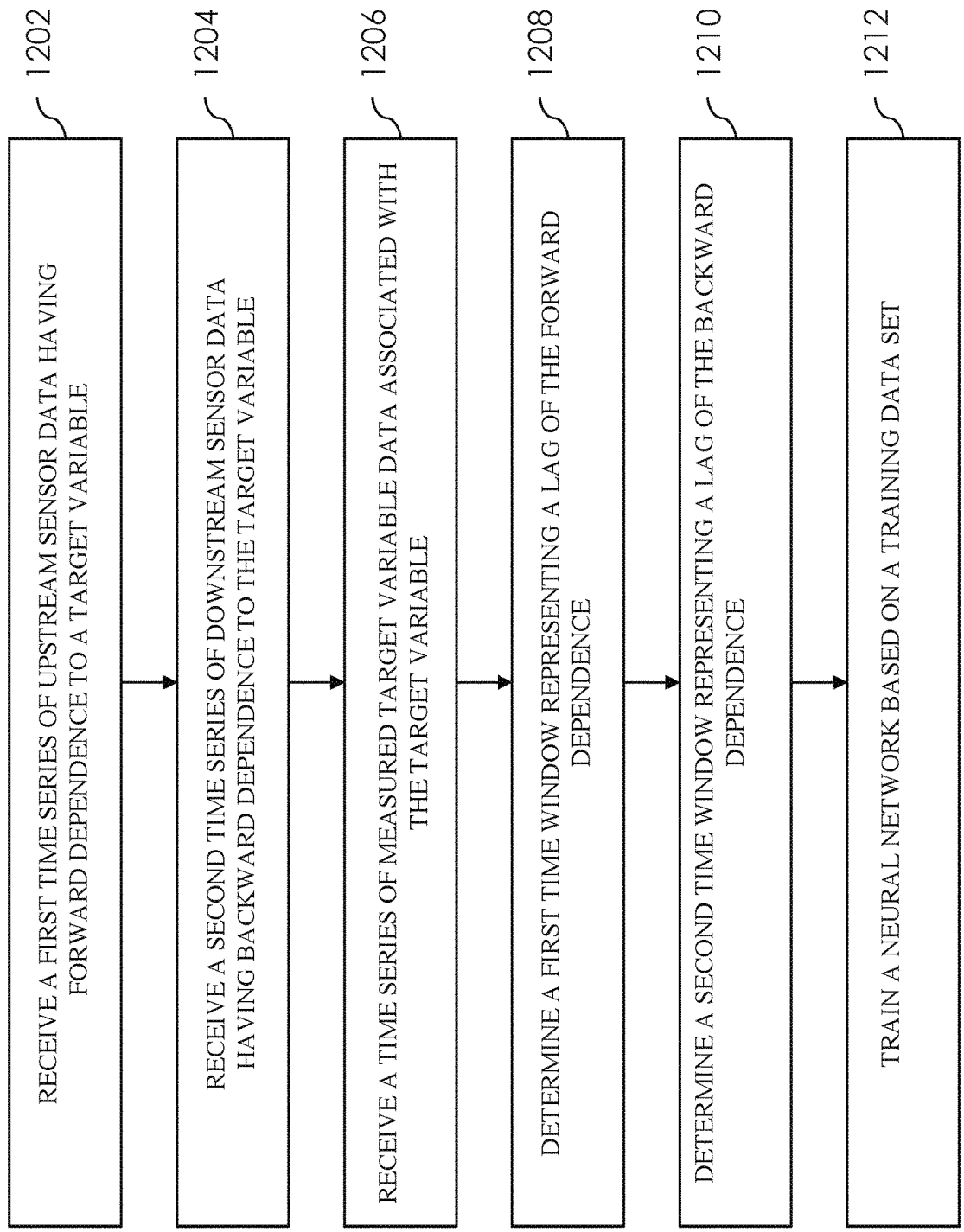
FIG. 12 is another flow diagram illustrating a method in an embodiment.

FIG. 12 is another flow diagram illustrating a method in an embodiment. At 1202, the method includes receiving a first time series of upstream sensor data having forward dependence to a target variable. The first time series of upstream sensor data can be a one-dimensional or multi-dimensional time series data. At 1204, the method includes receiving a second time series of downstream sensor data having backward dependence to the target variable. The second time series of downstream sensor data can be a one-dimensional or multi-dimensional time series data. At 1206, the method includes receiving a time series of measured target variable data associated with the target variable. The target variable has a measuring frequency, which is lower than the measuring frequencies associated with the upstream sensor data and the downstream sensor data. At 1208, the method includes determining a first time window representing a lag of the forward dependence between the upstream sensor data and the target variable. At 1210, the method includes determining a second time window representing a lag of the backward dependence between the downstream sensor data and the target variable. At 1212, the method includes training a machine learning model, such as a neural network, based on a training data set including at least the first time series of upstream sensor data in the first time window, the second time series of downstream sensor data in the second time window, and the time series of measured target variable data to estimate a value of the target variable at a given time. The training data set can include multiples of such sets of time series data.

The method can also include creating a causality relationship data structure forward linking in time the first time series of the upstream sensor data with the time series of measured target variable data and backward linking in time the second time series of the downstream sensor data with the times series of measured target variable data. The upstream sensor data and the downstream sensor data can be selected based on the causality relationship data structure.

In an embodiment, the trained machine learning model such as a neural network estimates the value of the target variable at the given time. In an embodiment, based on the value of the target variable estimated for the given time, the hardware processor further controls a set point in an industrial process. For example, the industrial process includes oil sand processing, and the target variable includes a property associated with tailing.

In an embodiment, the machine learning model such as a neural network includes an aggregation of a first neural network trained to predict the value of the target variable based on the first time series of the upstream sensor data's forward dependence, a second neural network trained to predict the value of the target variable based on the second time series of the downstream sensor data's backward dependence, and a third neural network trained to predict the value of the target variable based on the times series of measured target variable data.

In an embodiment, the measured target variable's report time has a delay from the target variable's harvest time. The training data set which includes the time series of measured target variable data can include data of the measured target variable determined at report time shifted to the measured target variable's corresponding harvest time. In an embodiment, the machine learning model such as a neural network at runtime estimates the value of the target variable at the given time without the delay.

Figure 13:
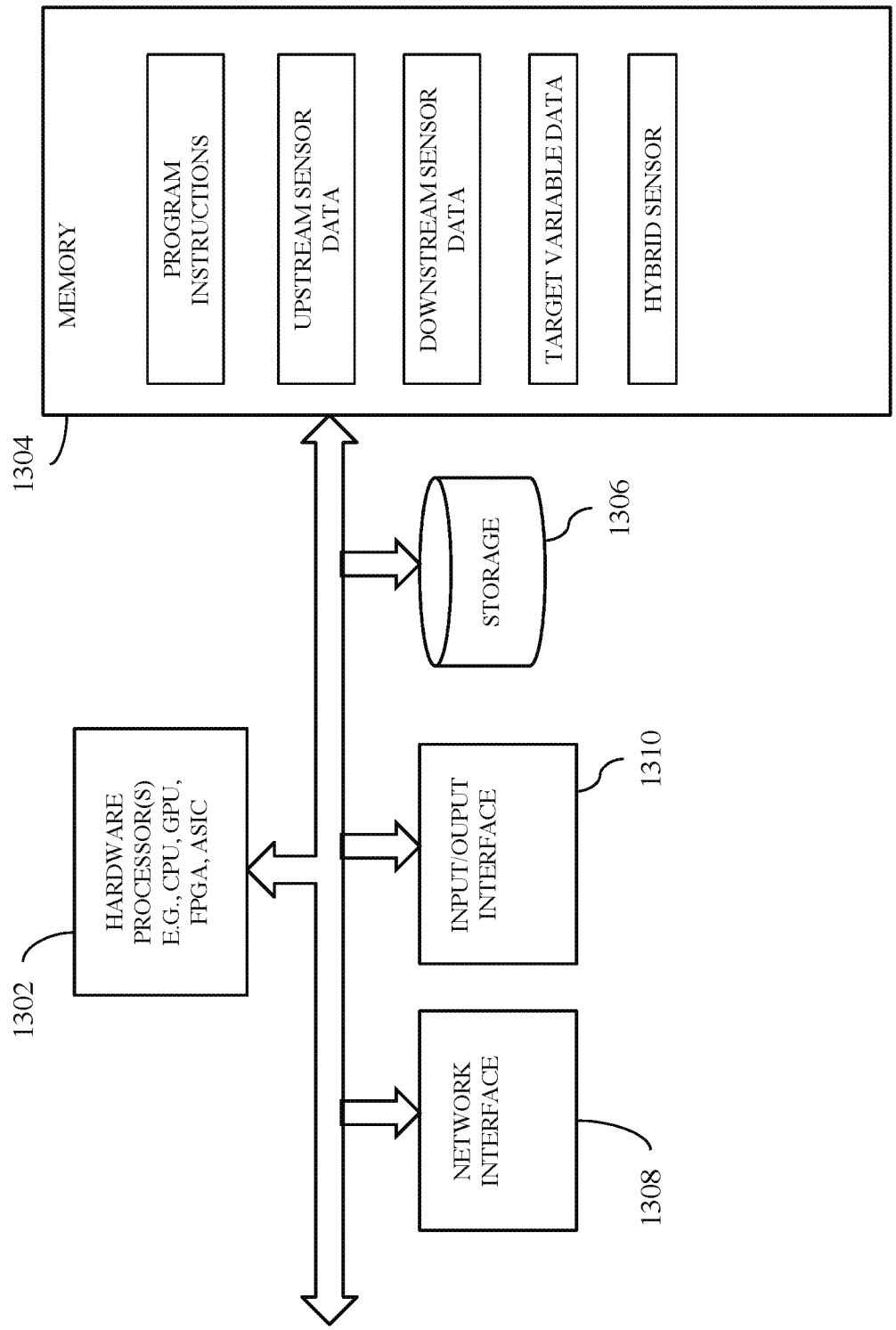
FIG. 13 is a diagram showing components of a system in one embodiment, which can generate a hybrid sensor in an embodiment.

FIG. 13 is a diagram showing components of a system in one embodiment, which can generate a hybrid sensor in an embodiment. One or more hardware processors 1302 such as a central processing unit (CPU), a graphic process unit (GPU), and/or a Field Programmable Gate Array (FPGA), an application specific integrated circuit (ASIC), and/or another processor, may be coupled with a memory device 1304, and generate a hybrid sensor. A memory device 1304 may include random access memory (RAM), read-only memory (ROM) or another memory device, and may store data and/or processor instructions for implementing various functionalities associated with the methods and/or systems described herein. One or more processors 1302 may execute computer instructions stored in memory 1304 or received from another computer device or medium. A memory device 1304 may, for example, store instructions and/or data for functioning of one or more hardware processors 1302, and may include an operating system and other program of instructions and/or data. One or more hardware processors 1302 may receive input, for example, receive a first time series of upstream sensor data having forward dependence to a target variable, receive a second time series of downstream sensor data having backward dependence to the target variable, and receive a time series of measured target variable data associated with the target variable. The first time series of upstream sensor data can be a one-dimensional or multi-dimensional time series data. The second time series of downstream sensor data can be a one-dimensional or multi-dimensional time series data. In an aspect, one or more hardware processors 1302 may also determining a first time window representing a lag of the forward dependence and determine a second time window representing a lag of the backward dependence between the downstream sensor data and the target variable. One or more hardware processors 1302 may train a machine learning model such as a neural network based on a training data set as described above. A hardware processor 1302 may run the trained machine learning model such as a neural network to estimate the value of the target variable at a given time. Based on the value of the target variable estimated for the given time, a hardware processor 1302 may further control a set point in an industrial process. In an embodiment, training data can be stored in a storage device 1306 or received via a network interface 1308 from a remote device, and may be temporarily loaded into a memory device 1304 for training the machine learning model such as a neural network. One or more hardware processors 1302 may be coupled with interface devices such as a network interface 1308 for communicating with remote systems, for example, via a network, and an input/output interface 1310 for communicating with input and/or output devices such as a keyboard, mouse, display, and/or others.

Figure 14:
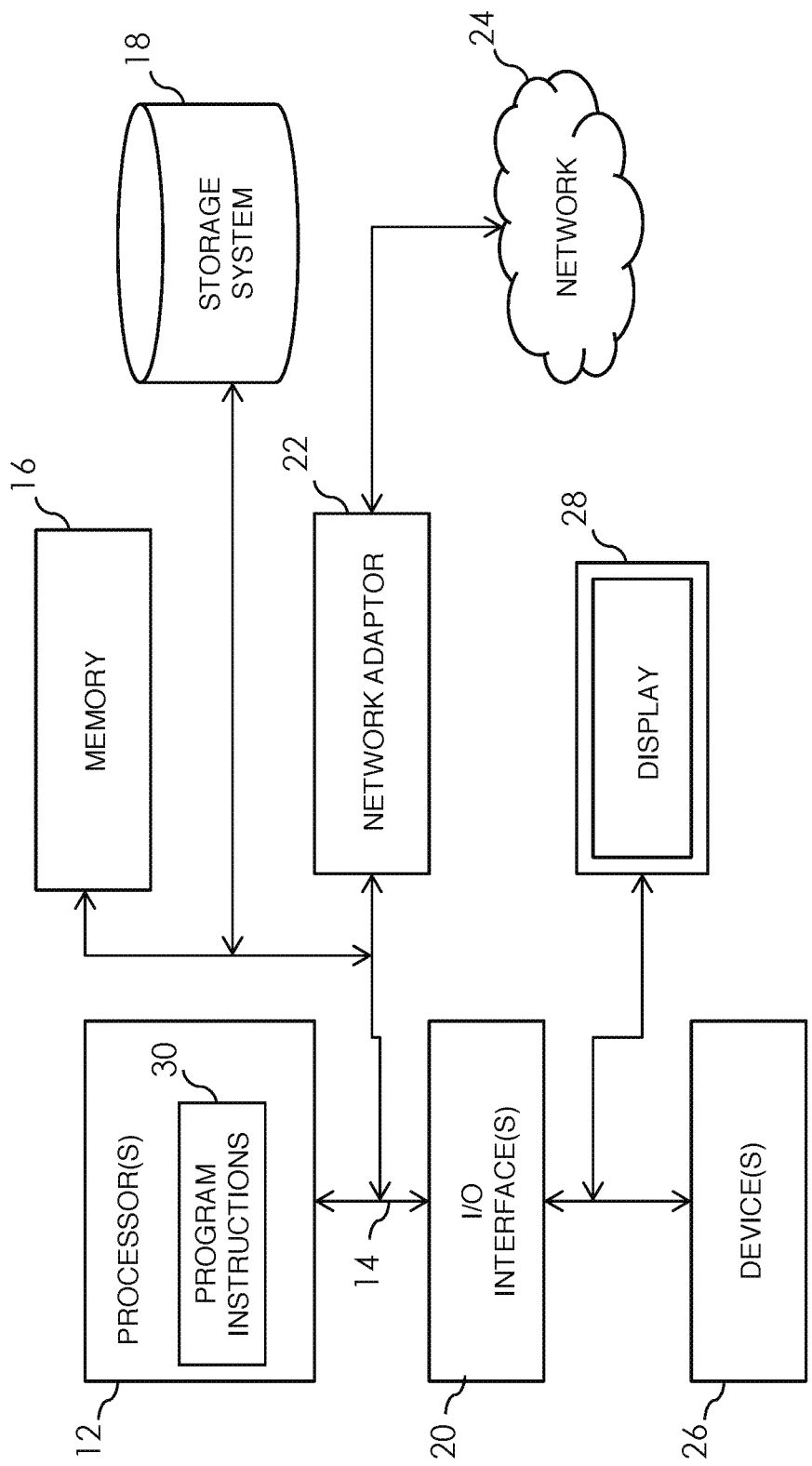
FIG. 14 illustrates a schematic of an example computer or processing system that may implement a hybrid sensor system in one embodiment.

FIG. 14 illustrates a schematic of an example computer or processing system that may implement a hybrid sensor generation system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 14 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system.

Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system of generating a hybrid sensor in industrial processing, comprising:
    a hardware processor; and
    a storage device coupled with the hardware processor;
    the hardware processor configured to at least:
        receive a first time series of upstream sensor data having forward dependence to a target variable;
        receive a second time series of downstream sensor data having backward dependence to the target variable;
        receive a time series of measured target variable data associated with the target variable, the target variable having a measuring frequency which is lower than measuring frequencies associated with the upstream sensor data and the downstream sensor data;
        determine a first time window representing a lag of the forward dependence between the upstream sensor data and the target variable;
        determine a second time window representing a lag of the backward dependence between the downstream sensor data and the target variable; and
        train a machine learning model based on a training data set including at least the first time series of upstream sensor data in the first time window, the second time series of downstream sensor data in the second time window, and the time series of measured target variable data to estimate a value of the target variable at a given time.

2. The system of claim 1, where in the hardware processor is further configured to create a causality relationship data structure forward linking in time the first time series of the upstream sensor data with the time series of measured target variable data, backward linking in time the second time series of the downstream sensor data with the times series of measured target variable data.

3. The system of claim 2, wherein the upstream sensor data and the downstream sensor data are selected based on the causality relationship data structure.

4. The system of claim 1, wherein the trained machine learning model estimates the value of the target variable at the given time, wherein based on the value of the target variable estimated for the given time, the hardware processor further controls a set point in an industrial process.

5. The system of claim 4, wherein the industrial process includes oil sand processing, and the target variable includes a property associated with tailing.

6. The system of claim 1, wherein the machine learning model includes an aggregation of a first neural network trained to predict the value of the target variable based on the first time series of the upstream sensor data's forward dependence, a second neural network trained to predict the value of the target variable based on the second time series of the downstream sensor data's backward dependence, and a third neural network trained to predict the value of the target variable based on the times series of measured target variable data.

7. The system of claim 6, wherein a measured target variable's report time has a delay from the target variable's harvest time, and the training data set including the time series of measured target variable data includes data of the measured target variable determined at report time shifted to the measured target variable's corresponding harvest time, wherein the machine learning model at runtime estimates the value of the target variable at the given time without the delay.

8. The system of claim 1, wherein the first time series of upstream sensor data includes a multi-dimensional time series data and the second time series of downstream sensor data includes a multi-dimensional time series data.

9. The system of claim 1, wherein the machine learning model includes a neural network model.

10. A computer program product comprising a computer readable storage medium having program instructions embodied therewith, the program instructions executable by a device to cause the device to:
receive a first time series of upstream sensor data having forward dependence to a target variable;
receive a second time series of downstream sensor data having backward dependence to the target variable;
receive a time series of measured target variable data associated with the target variable, the target variable having a measuring frequency which is lower than measuring frequencies associated with the upstream sensor data and the downstream sensor data;
determine a first time window representing a lag of the forward dependence between the upstream sensor data and the target variable;
determine a second time window representing a lag of the backward dependence between the downstream sensor data and the target variable; and
train a machine learning model based on a training data set including at least the first time series of upstream sensor data in the first time window, the second time series of downstream sensor data in the second time window, and the time series of measured target variable data to estimate a value of the target variable at a given time.

11. The computer program product of claim 10, wherein the device is further caused to create a causality relationship data structure forward linking in time the first time series of the upstream sensor data with the time series of measured target variable data, and backward linking in time the second time series of the downstream sensor data with the times series of measured target variable data.

12. The computer program product of claim 11, wherein the upstream sensor data and the downstream sensor data are selected based on the causality relationship data structure.

13. The computer program product of claim 10, wherein the trained machine learning model estimates the value of the target variable at the given time, wherein based on the value of the target variable estimated for the given time, the hardware processor further controls a set point in an industrial process.

14. The computer program product of claim 13, wherein the industrial process includes oil sand processing, and the target variable includes a property associated with tailing.

15. The computer program product of claim 10, wherein the machine learning model includes an aggregation of a first neural network trained to predict the value of the target variable based on the first time series of the upstream sensor data's forward dependence, a second neural network trained to predict the value of the target variable based on the second time series of the downstream sensor data's backward dependence, and a third neural network trained to predict the value of the target variable based on the times series of measured target variable data.

16. The computer program product of claim 15, wherein a measured target variable's report time has a delay from the target variable's harvest time, and the training data set including the time series of measured target variable data includes data of the measured target variable determined at report time shifted to the measured target variable's corresponding harvest time, wherein the machine learning model at runtime estimates the value of the target variable at the given time without the delay.

17. The computer program product of claim 10, wherein the first time series of upstream sensor data includes a multi-dimensional time series data and the second time series of downstream sensor data includes a multi-dimensional time series data.

18. The system of claim 1, wherein the machine learning model includes a neural network model.

19. A method of generating a hybrid sensor in industrial processing, comprising:
receiving a first time series of upstream sensor data having forward dependence to a target variable;
receiving a second time series of downstream sensor data having backward dependence to the target variable;
receiving a time series of measured target variable data associated with the target variable, the target variable having a measuring frequency which is lower than measuring frequencies associated with the upstream sensor data and the downstream sensor data;
determining a first time window representing a lag of the forward dependence between the upstream sensor data and the target variable;
determining a second time window representing a lag of the backward dependence between the downstream sensor data and the target variable; and
training a machine learning model based on a training data set including at least the first time series of upstream sensor data in the first time window, the second time series of downstream sensor data in the second time window, and the time series of measured target variable data to estimate a value of the target variable at a given time.

20. The method of claim 19, wherein the first time series of upstream sensor data includes a multi-dimensional time series data and the second time series of downstream sensor data includes a multi-dimensional time series data, and wherein the machine learning model includes a neural network model.

\* \* \* \* \*